US012574585B2

(12) United States Patent
Yang et al.

(10) Patent No.:  US 12,574,585 B2
(45) Date of Patent:     Mar. 10, 2026

(54) METHOD FOR PLAYBACK IN SPLIT SCREEN AND DISPLAY DEVICE

(71) Applicant: HISENSE VISUAL TECHNOLOGY CO., LTD., Shandong (CN)

(72) Inventors: Luming Yang, Shandong (CN); Yongjiang Sun, Shandong (CN); Chengchuang Xiao, Shandong (CN); Zhiyou Wu, Shandong (CN); Meiyu Liu, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 139 days.

(21) Appl. No.: 18/510,339

(22) Filed: Nov. 15, 2023

(65) Prior Publication Data

US 2024/0089526 A1      Mar. 14, 2024

Related U.S. Application Data

(63) Continuation of application No. PCT/CN2022/ 084106, filed on Mar. 30, 2022.

(30) Foreign Application Priority Data

May 17, 2021      (CN) .......................... 202110534832.1
May 21, 2021      (CN) .......................... 202110559872.1
Aug. 23, 2021      (CN) .......................... 202110969847.0

(51) Int. Cl.
*G06F 15/16*          (2006.01)
*H04N 21/43*          (2011.01)
(Continued)

(52) U.S. Cl.
CPC ... *H04N 21/43072* (2020.08); *H04N 21/4314* (2013.01); *H04N 21/43615* (2013.01)

(58) Field of Classification Search
CPC ......... H04N 21/43072; H04N 21/4314; H04N 21/43615
See application file for complete search history.

(56) References Cited

U.S. PATENT DOCUMENTS 7,100,123 B1 *      8/2006   Todd ....................... G06F 16/30
                                                          715/272
2008/0022352 A1      1/2008   Seo et al.
(Continued)

FOREIGN PATENT DOCUMENTS

CN          101615413 A      12/2009
CN          104332153 A       2/2015
(Continued)

OTHER PUBLICATIONS

International Search Report, mailed Jun. 8, 2022, from PCT/CN2022/ 084106, 4 pages.
(Continued)

*Primary Examiner* — Yves Dalencourt
(74) *Attorney, Agent, or Firm* — Workman Nydegger

(57)          ABSTRACT

Disclosed are a display apparatus and a split-screen playback method. The method includes: upon receiving media data pushed from the terminal device, detecting a type of a current signal source of the display apparatus; in response to the type of the current signal source being included in a source list, starting a split-screen playback mode in the display apparatus, generating a first window and a second window, presenting the first window and the second window, on a display, and displaying video data from the current signal source in the first window and displaying the media data from the terminal device in the second window; in response to the type of the current signal source being not included in the source list, not generating the first window and the second window, and presenting the video data from
(Continued)

the current signal source in a full-screen mode on the display.

16 Claims, 15 Drawing Sheets

(51) Int. Cl.
      *H04N 21/431*          (2011.01)
      *H04N 21/436*          (2011.01)

(56)                        References Cited

U.S. PATENT DOCUMENTS

| | | | |
|---|---|---|---|
| 2015/0150066 A1 | 5/2015 | Park et al. | |
| 2016/0054895 A1* | 2/2016 | Lee ..................... | G06V 40/176 |
| | | | 715/716 |
| 2018/0196596 A1* | 7/2018 | Choi ..................... | H04W 4/80 |

FOREIGN PATENT DOCUMENTS

| | | |
|---|---|---|
| CN | 105791351 A | 7/2016 |
| CN | 105897521 A | 8/2016 |
| CN | 106802759 A | 6/2017 |
| CN | 107135417 A | 9/2017 |
| CN | 107896339 A | 4/2018 |
| CN | 108540838 A | 9/2018 |
| CN | 108668159 A | 10/2018 |
| CN | 110312160 A | 10/2019 |
| CN | 110324701 A | 10/2019 |
| CN | 110661993 A | 1/2020 |
| CN | 111314624 A | 6/2020 |
| CN | 111427527 A | 7/2020 |
| CN | 111601120 A | 8/2020 |
| CN | 111813363 A | 10/2020 |
| CN | 112073797 A | 12/2020 |
| CN | 112075074 A | 12/2020 |
| CN | 112099750 A | 12/2020 |
| CN | 112616065 A | 4/2021 |
| JP | 2016161753 A | 9/2016 |

OTHER PUBLICATIONS

Jing, Dong, "Web Application Development Technology", Planning Textbook for Digital Media Majors in Higher Education Institutions during the 13th Five Year Plan, Beijing: China Railway Publishing House Co., Ltd., Aug. 2019, 3 pages.

* cited by examiner

200

First window

Exit control

Second window (having a focus currently and used to play audio of media data)

First window (having a focus currently and used to play audio of a current signal source)

Second window

Third operation prompt message

First window

Second
window A

Second
window B

First
window

Second
window
B

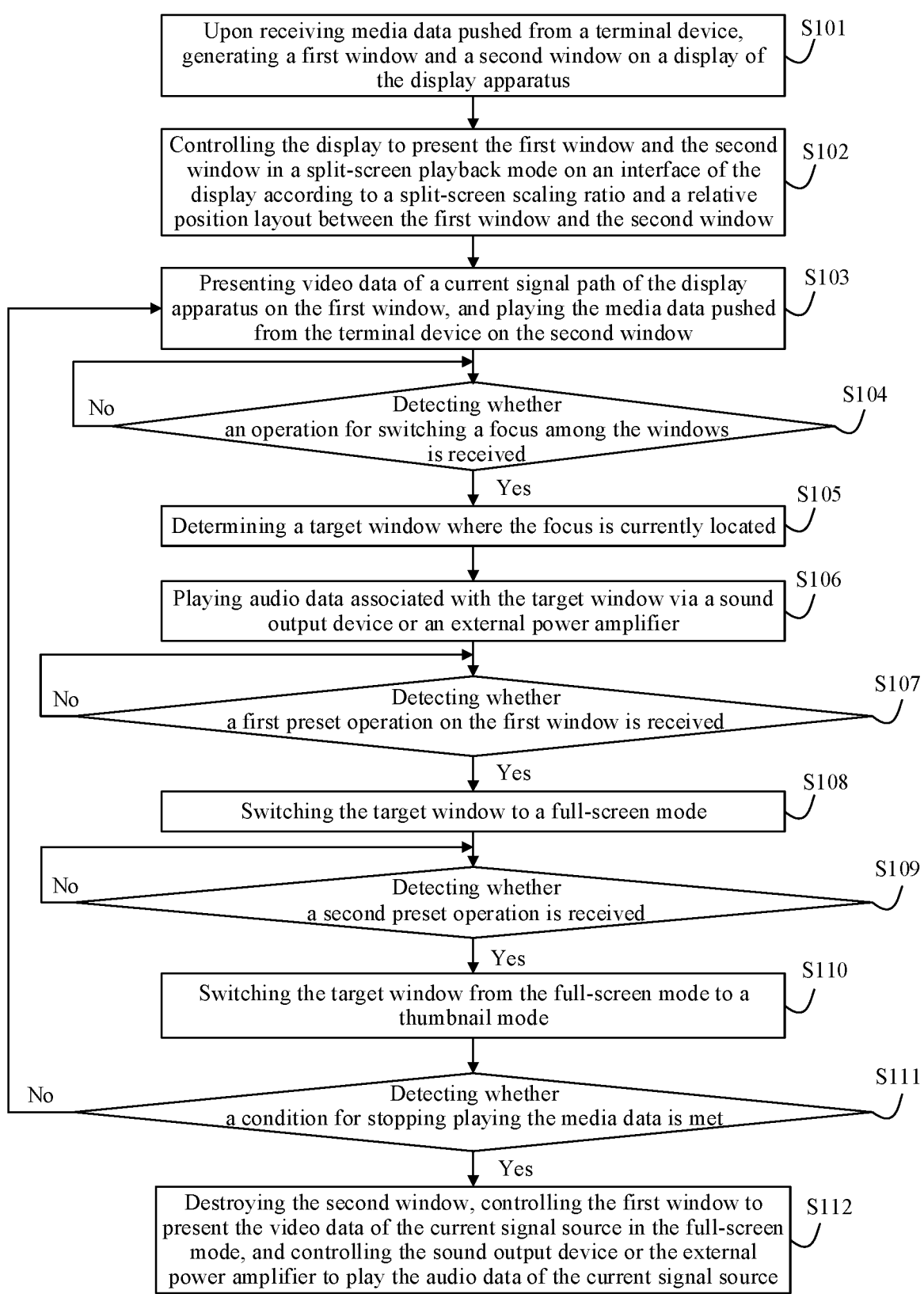

Upon receiving media data pushed from a terminal device, generating a first window and a second window on a display of the display apparatus — S101

Controlling the display to present the first window and the second window in a split-screen playback mode on an interface of the display according to a split-screen scaling ratio and a relative position layout between the first window and the second window — S102

Presenting video data of a current signal path of the display apparatus on the first window, and playing the media data pushed from the terminal device on the second window — S103

Detecting whether an operation for switching a focus among the windows is received — S104
No / Yes Determining a target window where the focus is currently located — S105

Playing audio data associated with the target window via a sound output device or an external power amplifier — S106

Detecting whether a first preset operation on the first window is received — S107
No / Yes Switching the target window to a full-screen mode — S108

Detecting whether a second preset operation is received — S109
No / Yes

Switching the target window from the full-screen mode to a thumbnail mode — S110

Detecting whether a condition for stopping playing the media data is met — S111
No / Yes Destroying the second window, controlling the first window to present the video data of the current signal source in the full-screen mode, and controlling the sound output device or the external power amplifier to play the audio data of the current signal source — S112

FIG. 8

METHOD FOR PLAYBACK IN SPLIT SCREEN AND DISPLAY DEVICE

CROSS REFERENCE TO RELATED APPLICATIONS

This application is a continuation application of International Application No. PCT/CN2022/084106, filed on Mar. 30, 2022, which claims the priorities of Chinese patent application No. 202110559872.1, filed on May 21, 2021, Chinese patent application No. 202110534832.1, filed on May 17, 2021, and Chinese patent application No. 202110969847.0, filed on Aug. 23, 2021, the contents of which are incorporated herein by reference.

FIELD

The disclosure relates to the field of display apparatuses, in particular to a method for playback in split screen, and a display apparatus.

BACKGROUND

In some scenarios, users can perform screen projection on a display apparatus through terminal devices such as a smart phone and a personal computer, PC, so as to project media data such as pictures, audio, and video from the terminal devices on display apparatuses for large-screen playback. Since the display apparatus only supports single path video playback at present, when the display apparatus is playing signals from a physical signal source A, if the media data pushed from the terminal device is received, the display apparatus will automatically switch to a physical signal source B corresponding to the media data. For example, the display apparatus is currently displaying a game interface from a signal source corresponding to a game console, and in this case, if video data from another screen projection device is received, since the two signal streams are not compatible, the game interface will exit by default and then the video data will be played automatically, resulting in game termination for the user.

SUMMARY

In a first aspect, embodiments of the present disclosure provide a display apparatus, including: a display, configured to present a picture and/or a user interface; a communicating device, in communication with a device or network; a sound output device or an external power amplifier, configured to output sound; and at least one processor, in connection with the display, the communicating device and the sound output device, and configured to execute instructions to cause the display apparatus to: upon receiving media data pushed from a terminal device, detect a type of a current signal source of the display apparatus; in response to the type of the current signal source being included in a source list, start a split-screen playback mode, generate a first window and a second window, present the first window and the second window, on the display and display video data from the current signal source in the first window and display the media data from the terminal device in the second window; in response to the type of the current signal source being not included in the source list, not generate the first window and the second window, present the video data from the current signal source in a full-screen mode on the display; where the source list includes one or more signal source types that support the split-screen playback mode.

In a second aspect, embodiments of the present disclosure provide a split-screen playback method for a display apparatus. The method includes: upon receiving media data pushed from the terminal device, detecting a type of a current signal source of the display apparatus; in response to the type of the current signal source being included in a source list of the display apparatus, starting a split-screen playback mode in the display apparatus, generating a first window and a second window, presenting the first window and the second window, on a display of the display apparatus, and displaying video data from the current signal source in the first window and displaying the media data from the terminal device in the second window; in response to the type of the current signal source being not included in the source list, not generating the first window and the second window, and presenting the video data from the current signal source in a full-screen mode; where the source list includes one or more signal source types that support the split-screen playback mode on the display.

BRIEF DESCRIPTION OF THE DRAWINGS

FIG. 8 illustrates a flow diagram of a method for playback in split screen according to some embodiments of the disclosure.

DETAILED DESCRIPTION OF THE EMBODIMENTS

In order to make the objectives and embodiments of the disclosure clearer, the exemplary embodiments of the disclosure will be clearly and completely described below in combination with the accompanying drawings in the exemplary embodiments of the disclosure. Apparently, the described exemplary embodiments are only part of embodiments rather than all embodiments of the disclosure.

It should be noted that the brief description of terms in the disclosure is merely for facilitating understanding of the embodiments described below, rather than intended to limit the embodiments of the disclosure. Unless otherwise indicated, these terms should be understood in plain and ordinary meaning.

The terms "first", "second", "third", etc. in the description and claims of the disclosure and the above accompanying drawings are used to distinguish similar or same objects or entities, but do not necessarily limit a specific order or sequence, unless otherwise stated. It should be understood that the terms used in this way can be interchanged where appropriate.

Figure 1:
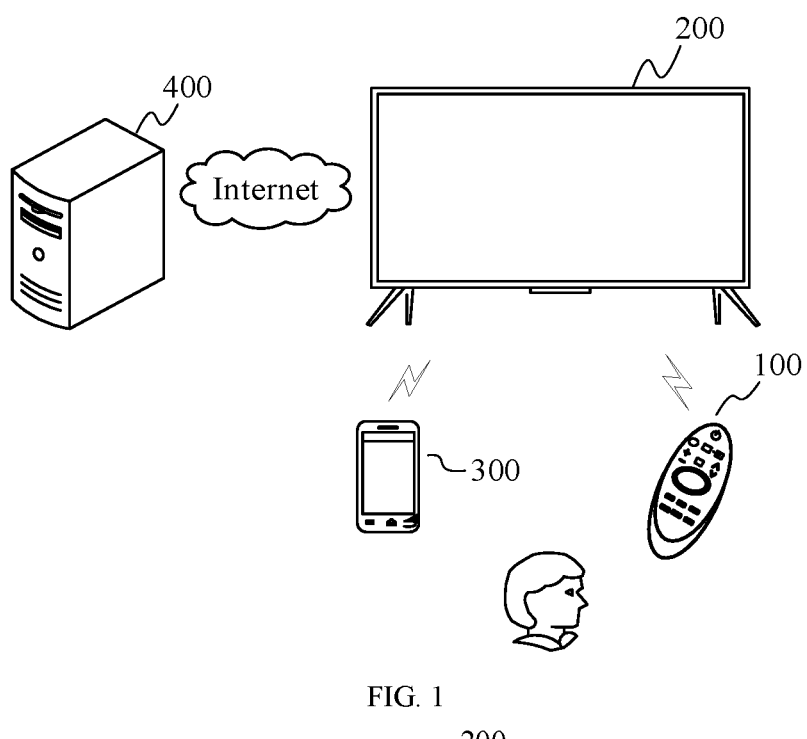
FIG. 1 illustrates a usage scenario of a display apparatus according to some embodiments of the disclosure.

FIG. 1 illustrates a schematic diagram of an operation scenario between a display apparatus and a control device according to some embodiments of the disclosure. As shown in FIG. 1, a user may operate a display apparatus 200 via an intelligent device 300 or a control device 100.

The control device 100 may be a remote controller, communications between the remote controller and the display apparatus includes infrared protocol communication or Bluetooth® protocol communication, and other short-distance communication methods, and the display apparatus 200 may be controlled by wireless or other wired methods. The user may control the display apparatus 200 by inputting user commands through buttons on the remote control, voice input, control panel input, and the like.

In some embodiments, the display apparatus 200 may be controlled by the intelligent device 300 (such as, a mobile terminal, a tablet computer, a computer, a laptop, etc.). For example, applications running on the intelligent device are used to control the display apparatus 200.

In some embodiments, the display apparatus 200 may receive instructions without using the intelligent device or control device above, but is controlled by a user via a touch or a gesture.

In some embodiments, the display apparatus 200 may further be controlled by a different device other than the control device 100 and the intelligent device 300. For example, the display apparatus may be controlled by a voice command from a user received by a module for obtaining voice commands arranged inside the display apparatus 200, or controlled by a voice command from a user received by a voice control device arranged outside the display apparatus 200.

In some embodiments, a display apparatus 200 is further in data communication with the server 400. The display apparatus 200 is in communication and connection with other networks via a local area network (LAN) and a wireless local area network (WLAN). The server 400 may provide various contents and interactions for the display apparatus 200.

The control device 100 may receive operation instructions from the user, and convert the operation commands into instructions that can be recognized and responded by the display apparatus 200, and play an intermediary role between the user and the display apparatus 200.

Figure 2:
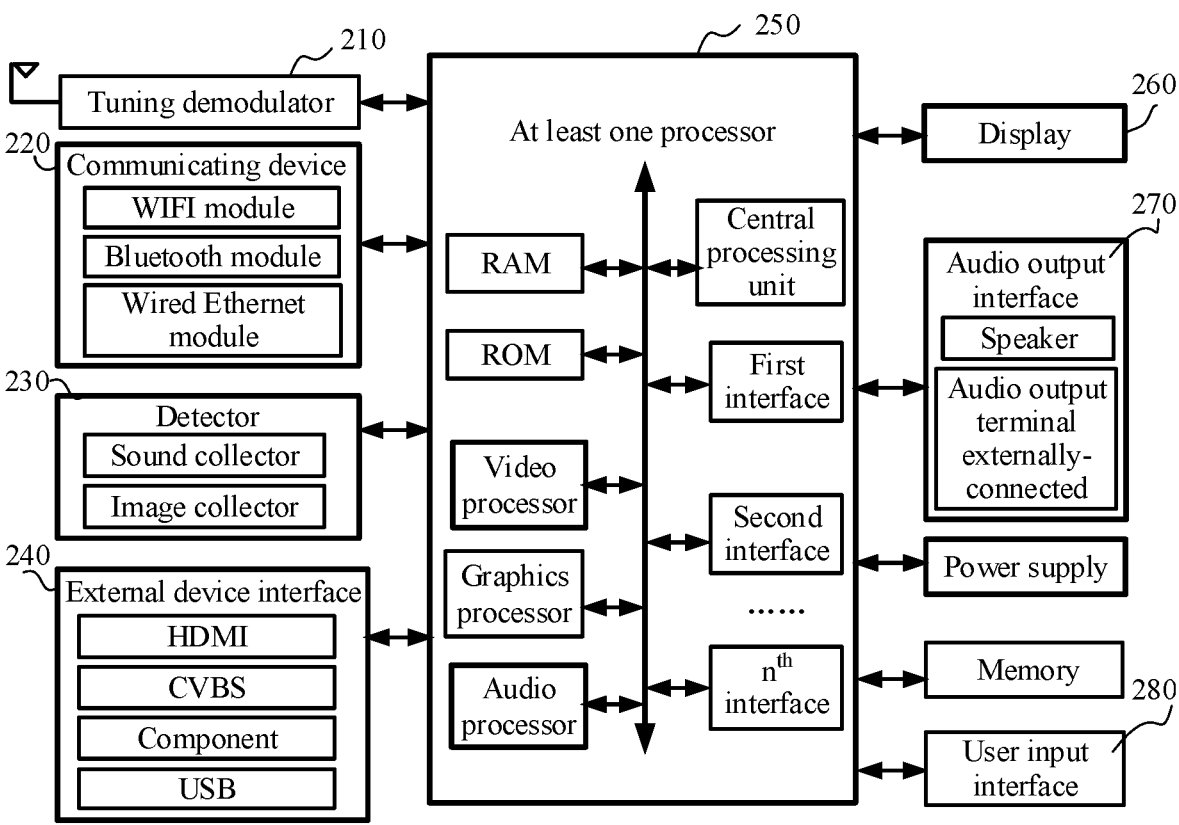
FIG. 2 illustrates a block diagram of hardware configuration of the display apparatus 200 according to some embodiments of the disclosure.

As shown in FIG. 2, the display apparatus 200 includes at least one of a tuning demodulator 210, a communicating device 220, a detector 230, an external device interface 240, at least one processor 250, a display 260, an audio output interface 270, a memory, a power supply and a user input interface 280.

The display 260 includes a panel component for presenting pictures and a drive component for driving picture display, and is configured to receive a picture signal from a processor, to present a video content, a picture content, a component for a menu operation interface, a user interface (UI) for user operations, etc.

The display 260 may be a liquid crystal display, an organic light-emitting diode (OLED) display, or a projection display, and may further be a projection device and a projection screen.

The communicating device 220 is a component for communicating with an external device or a server according to various types of communication protocols. For example, the communicating device may include at least one of a WIFI module, a Bluetooth module, a wired Ethernet module, other network communication protocol chips or a near field communication, NFC, protocol chips, and an infrared receiver. The display apparatus 200 may establish transmission and reception of control signals and data signals with the control device 100 or the server 400 via the communicating device 220.

The user input interface is configured to receive a control signal from the control device 100.

The detector 230 is configured to collect a signal from external environment or a signal for interacting with outside. For example, the detector 230 includes a light receiver, and a sensor for collecting ambient light intensity; or, the detector 230 includes an image collector, such as a camera, which may be configured to collect external environment scenarios, user attributes or interaction gestures of a user; or, the detector 230 includes a sound collector, such as a microphone, which is configured to receive external sound.

The external device interface 240 may include, but not limited to, any one or more of the following interfaces or ports: a high-definition multimedia interface (HDMI), an analog or digital high-definition component input interface (component), a composite video broadcast signal (CVBS), a universal serial bus (USB) input ports, and red, green and blue (RGB) ports, and may also be a composite input/output interface formed by the plurality of interfaces described above.

The at least one processor 250 and the tuning demodulator 210 may be located in different individual devices. That is, the tuning demodulator 210 may also be in an external device of a main device in which the processor 250 is located, such as an external set-top box.

The at least one process 250 controls work of the display apparatus and responds to operations from users via various software programs stored in a memory. The at least one processor 250 control an overall operation of the display apparatus 200. In some embodiments, the user may input a user command through a graphical user interface (GUI) presented on the display apparatus 200, and the user input interface receives a user command from the user through the GUI. Alternatively, the user may input a user command by specific sounds or gestures, and the user input interface recognizes the sounds or gestures through a sensor to receive the user command from the user.

In some embodiments, the terminal device may push media data to the display apparatus. For example, the user can cast their interested video sources to the display apparatus for large-screen playback through screen projection functions of some video APPs; alternatively, the terminal device is in connection with the display apparatus via some protocols, such as Digital Living Network Alliance (DLNA) protocol. When the media data is displayed in the terminal device, the user can select a device from a device list for playing the media data, and the display apparatus that supports the screen projection function will be recognized and automatically added to the device list. After selecting the display apparatus from the device list by the user, the media data can be projected from the terminal device to the display apparatus for playback. When the media data is pushed by screen projection, the terminal device and the display apparatus generally need to be connected to a same WiFi network, and the method for the terminal to push media data to the display apparatus is not limited. Of course, in other technologies, the screen projection method can also be performed across networks.

In some embodiments, the media data of the disclosure includes, but is not limited to, one or more media forms of data in variety of formats such as a text, an image, audio and video.

In some embodiments, if the media data is a text, text information of the text may be presented on the interface of the display apparatus. If the amount of text information is large and cannot be presented on a single page completely, the text information may be presented in scrolling manner which allows a user to scroll through pages, etc.

In some embodiments, if the media data is an image, it may be a static image or a dynamic image (such as an animation in GIF format), and the display apparatus may load and present the image on the interface.

In some embodiments, if the media data is audio, a voice control may be generated and presented on the interface of the display apparatus. After the user selects on a voice control, the display apparatus may play the audio through speaker arranged inside the display apparatus or an external power amplifier, and the users may also use voice controls to pause, etc.

In some embodiments, if the media data is video, the video needs to be loaded and presented on the interface of the display apparatus. The video may be a video source from a video application, or a browser-based web video source, or a local video stored in a terminal device.

After receiving media data pushed from the terminal, the display apparatus may provide adaptive presentation and playback modes of the media data according to the specific format and type of the media data being pushed.

In view of this, now the display apparatus needs to switch the signal source after receiving the media data pushed by the terminal device, discontinue/terminating playing the video signal from the current signal source, and start displaying the media data pushed from the terminal device, resulting termination of video display from the original signal source. Therefore, this disclosure provides a split-screen playback mode, so that after receiving the media data pushed from a terminal, the display apparatus synchronously play the media data pushed from the terminal device and video data from the current signal source in different windows in the split-screen playback mode, rather than switching signal source. The disclosure first describes the embodiments of split-screen playback from UI perspective.

Figure 3:
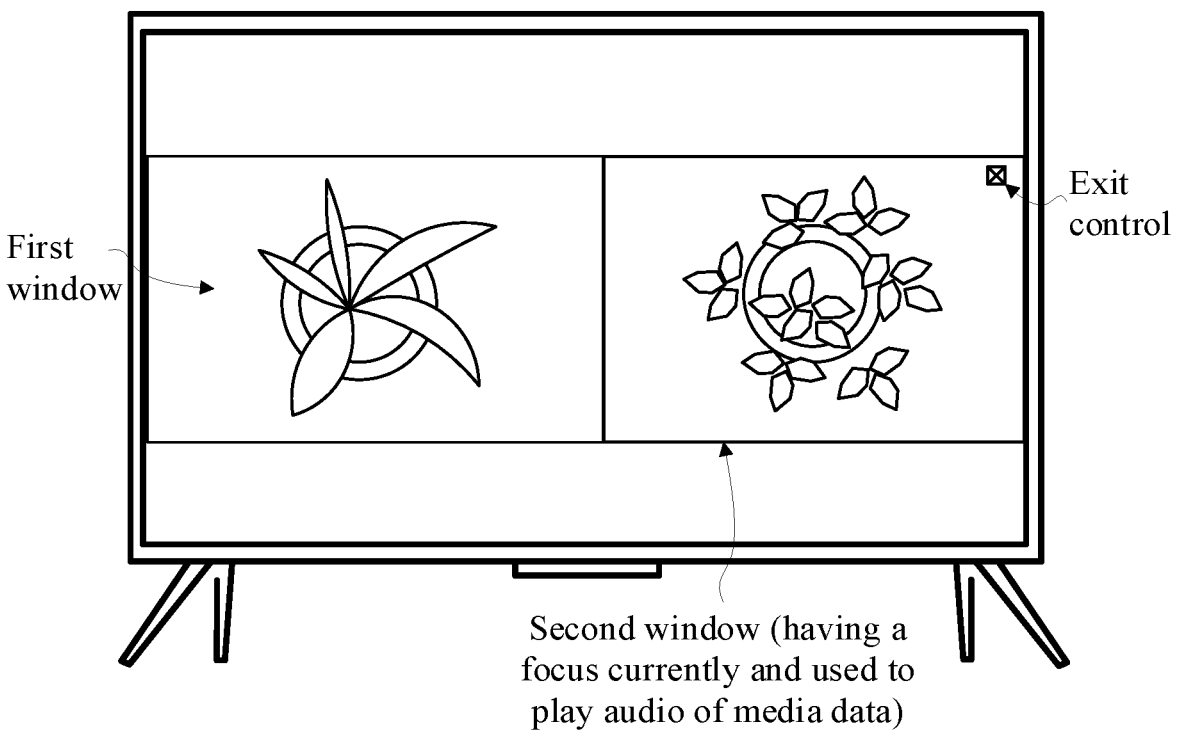
FIG. 3 illustrates an interface display effect A of first and second windows according to some embodiments of the disclosure.

In some embodiments, the display apparatus generates a first window and a second window when media data pushed by a terminal device is received, and respectively presents the first window and the second window in a split-screen playback mode according to a split-screen scaling ratio and a relative position layout between the first and second windows. As shown in FIG. 3, the relative position layout is that the first window is on the left side of the middle part and the second window is on the right side of the middle part, and the two windows are presented on the interface of the split-screen playback according to a certain split-screen scaling ratio. The left side of the middle part refers to a position that is centered in a vertical direction and deviated to the left in a horizontal direction, and the right side of the middle part refers to a position that is centered in the vertical direction and deviated to the right in the horizontal direction.

In some embodiments, the split-screen scaling ratio may be preset, for example, in the horizontal direction, the first window and the second window are scaled and adjusted according to a preset ratio of P=(a width $W_1$ of the first window)/(a width $W_2$ of the second window), to allocate the proportion of the two windows in the horizontal direction of the screen.

Figure 4:
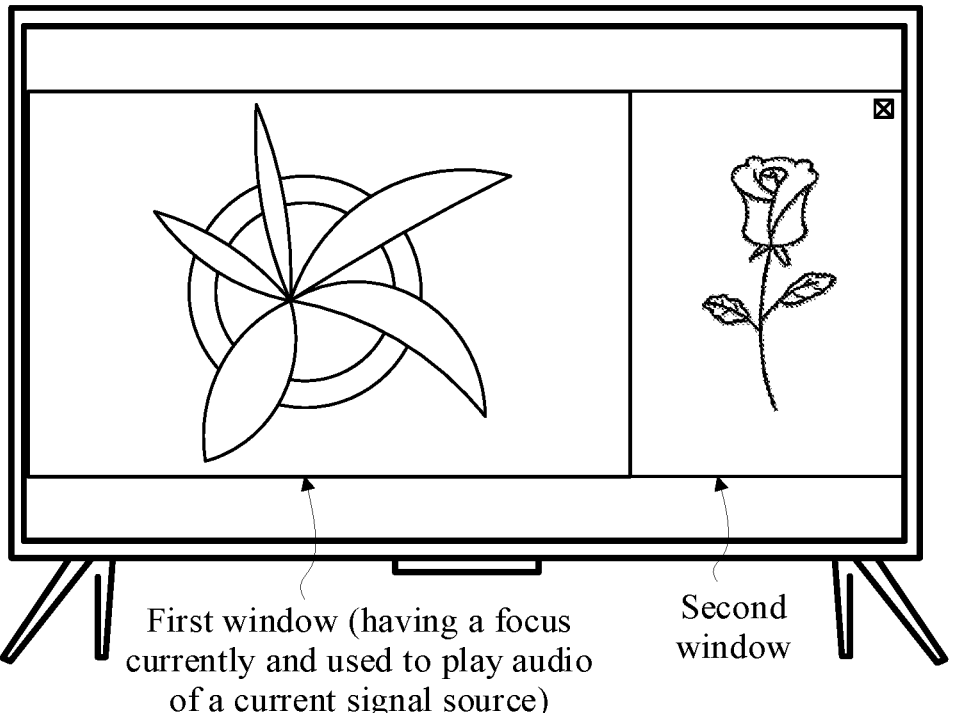
FIG. 4 illustrates an interface display effect B of first and second windows according to some embodiments of the disclosure.

In some embodiments, the split-screen scaling ratio may also be designed according to factors such size of the screen, size of a video to be loaded in the two windows, and a type of screen orientation, so that the sizes of the two windows after scaled are more adaptable to and match the interface of the screen. The type of the screen orientation includes landscape mode and portrait mode. In a case where an aspect ratio of a window is greater than or equal to 1, the window is a landscape window; in a case where an aspect ratio of a window is less than 1, the window is a portrait window. As shown in FIG. 4, the second window presents media data in a portrait mode, and the value of P may be increased accordingly. The design of the split-screen scaling ratio is not limited.

In some embodiments, video data is presented in the first window, media data is loaded and played in the second window, and the first and second windows are presented in parallel in a split-screen playback interface to realize synchronized playback of the data from two signal sources, one signal source being the pushed media data, and the other signal source being the signal source of the display apparatus before receiving media data from the external device. The signal source comprises signal sources connected with the display apparatus via the external device interfaces, such as HDMI, USB, antenna/cable port and so on, signal sources from web applications, and signal sources from external devices according to communication protocols, for example, signal source pushed from an external device.

In some embodiments, a signal source played by the display apparatus currently is not limited. For example, the signal source may be video data in set-top boxes, game consoles, DVDs, etc. connected through HDMI interface, video data in electronic devices connected through video graphics array (VGA) interface, or video data in storage devices connected through USB port. Each signal source has a corresponding signal input path, such as HDMI, VGA, AV, USB, LAN and fiber optical port, etc. The types of signal sources depend on display apparatuses.

FIG. 3 and FIG. 4 show a two split-screen playback mode, to realize synchronous playback of data from two paths. In an exemplary embodiment, the display apparatus may not limited in two paths split-screen playback. For example, in a case that multiple media data are pushed to the display apparatus, assuming that the display apparatus receives M paths media data, M is greater than 1, then M second windows may be generated, and adding a first window, there are total of M+1 windows to realize split-screen playback of multi-path data.

In some embodiments, the first window and the second window(s) are presented on different layers. The first window is presented on a video layer of the display, and the second window is presented on an on-screen display (OSD) layer. The video layer may be presented according to the highest resolution supported by the display apparatus, such as 4K TV, i.e., the resolution of the video layer is 3840*2160. The OSD layer generally defaults to 2K display, i.e., the resolution is 1920*1080. When M is greater than 1, sizes of M+1 windows and the arrangement of M+1 windows in the split-screen playback interface may be designed according to factors such as the value of M, a resolution, size of media data from each path, an aspect ratio/an type of the screen orientation of the media data from each path, etc.

In some embodiments, the user can switch a focus among the first window and the second window(s). For example, in FIG. 5 or FIG. 6, a user selects the "left button" on the remote controller to place the focus on the first window, and then the user selects the "right button" to switch the focus to the second window, that is, the move and switch of the focus may be achieved by operating the left or right button on the remote controller according to a current focus, where the window where the focus holds is a target window. It should be noted that the operation for switching the focus among the windows is not limited, for example, the focus may be adjusted by inputting a voice command, selecting by touching the screen, or moving the remote controller.

In some embodiments, since the split-screen playback interface has at least two windows, and the display apparatus only supports a single audio output, if the media data has audio, for example, the media data is pure audio, audio and video, an image with background audio, a text with background audio, a graphics with background audio, etc., it will conflict with audio data of the signal source in the first window.

In some embodiments, only the audio data associated with the target window currently having a focus is played. For example, in a case where the focus is currently on the first window, only the audio data of the current signal source is played, and the audio of the media data is not played; in a case where the focus currently holds on the second window, only the audio of the media data for the second window is played, and the audio data of the current signal source is not played. In an exemplary embodiment, when the first window and the second window are initially displayed, the focus may be set to the first window by default, that is, the audio of the current signal source is played by default when split-screen playback is just started. Subsequently, the user may choose whether to switch the focus according to their requirements, and when switching the focus, identify and position the target window pointed by the focus, and play the audio associated with the target window in a single path. In this way, the audio can be switched according to user's requirements, and playback conflicts between multiple audio paths can be avoided.

In some embodiments, when the display apparatus is connected with an external audio output device, it can be set that the audio data corresponding to the window where the focus is currently located is played by a local speaker of the display apparatus, while the audio data corresponding to another window is played by the external audio output device.

In FIG. 3 and FIG. 4, both the first window and the second window are thumbnail windows that have been scaled and adjusted. In an exemplary embodiment, for a target window with the focus, the user may switch the target window from a thumbnail mode to a full-screen mode by inputting a first preset operation on the target window. The first preset operation comprises, for example, pressing the "confirmation/OK" button on the remote controller. After the focus is selected and maintained, the user continues to press the confirmation button on the remote controller, the target window is automatically switched to present in the full-screen mode, and other non-target window will be covered by the target window. The first preset operation is not limited to the operation above.

In some embodiments, for the target window switched to the full-screen mode, the user may input a second preset operation to cause the target window to exit from the full-screen mode. For example, when the media data is currently presented in the full-screen mode, the user selects the "Return" button on the remote controller to switch the full screen window of the media data to the previous second window in the thumbnail mode, and in this case, the screen interface of the display apparatus returns to the mode of split-screen synchronous playback of data from multi-path on the first window and the second window respectively. Due to the starting and exiting from the full-screen mode of the second window only changes presentation mode of the window(s), while the total number of windows on the split-screen playback interface remains unchanged, so the size and position layout of each window on the split-screen playback interface remain unchanged, which is consistent with the window(s) before switching to the full-screen mode. The second preset operation is not limited to the above operation.

Figure 5A:
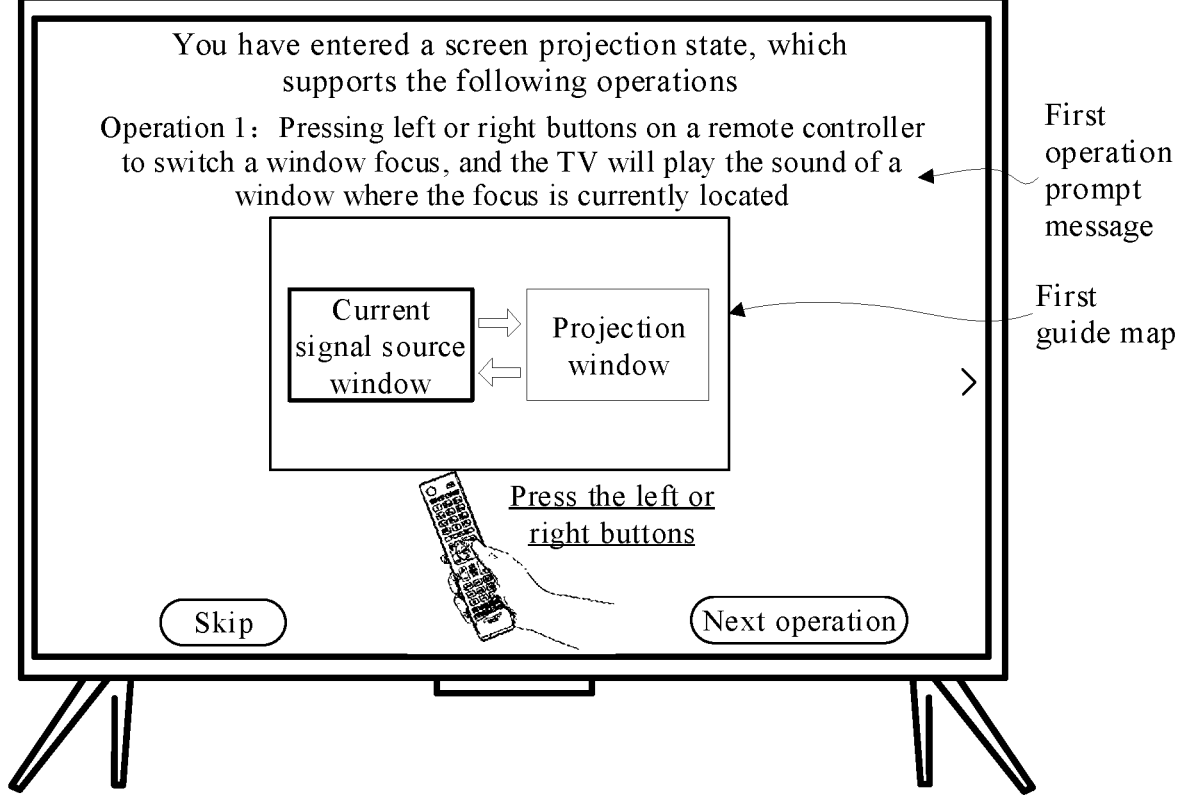
FIG. 5A illustrates is a schematic diagram of a guide page of a first operation according to some embodiments of the disclosure.
Figure 5B:
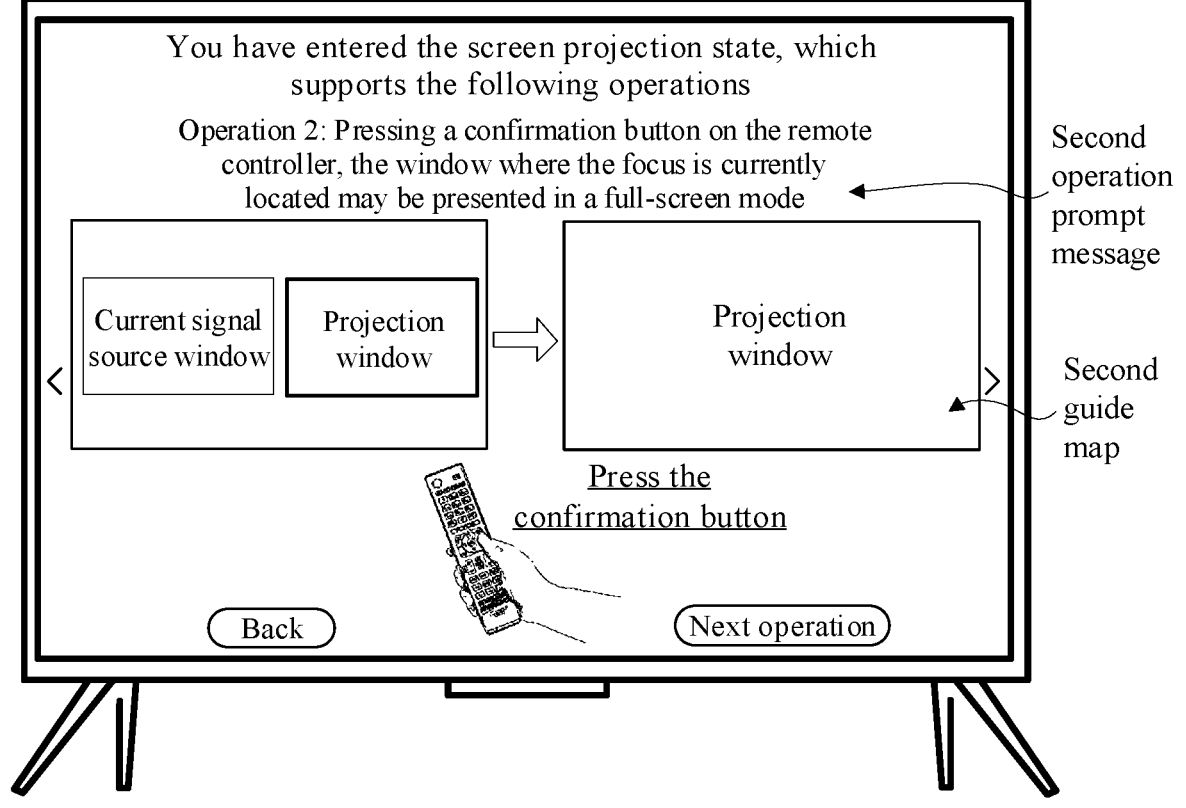
FIG. 5B illustrates is a schematic diagram of a guide page of a second operation according to some embodiments of the disclosure.
Figure 5C:
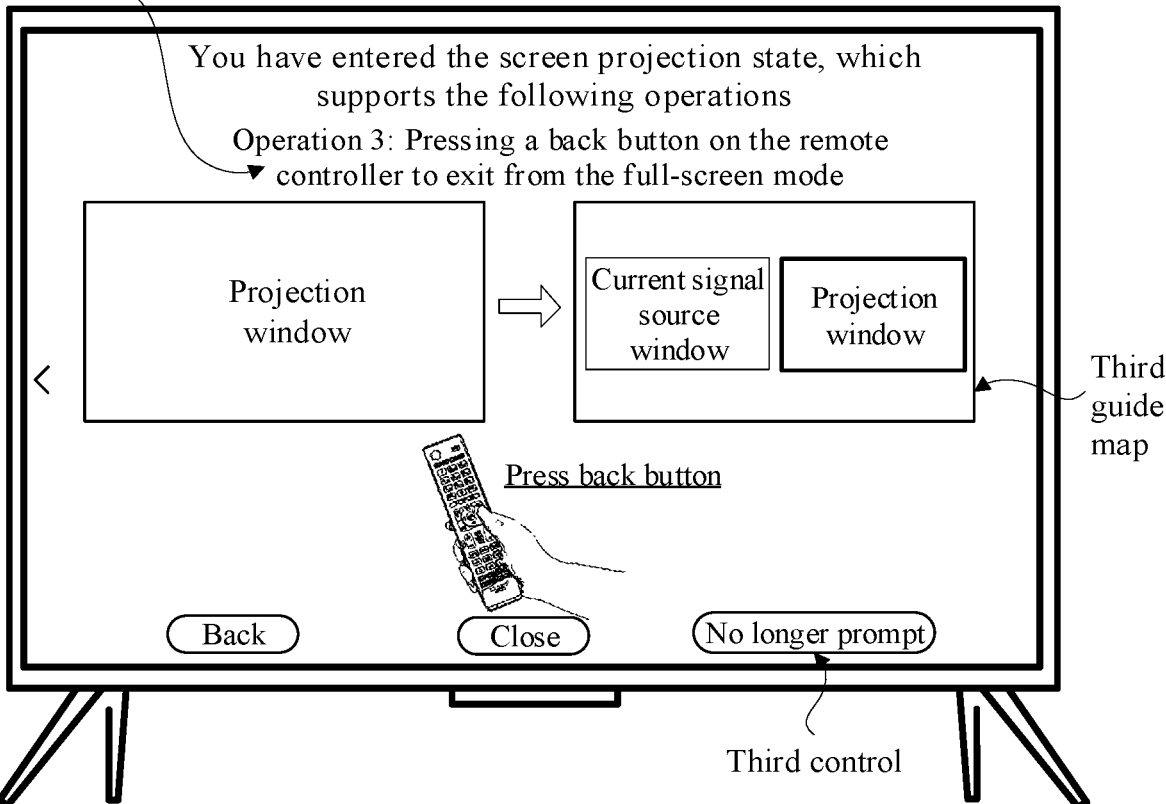
FIG. 5C illustrates is a schematic diagram of a guide page of a third operation according to some embodiments of the disclosure.

In some embodiments, in order to guide the user to perform correct operations in a multi-window split-screen playback mode, before presenting the first window and the second window, an operation guidance page as shown in FIG. 5A to FIG. 5C may be presented first. FIG. 5A shows a first operation guidance page, and a first operation prompt message is presented on the first operation guidance page, such as "Operation 1: Pressing left or right buttons on a remote controller to switch a window focus, and the TV will play the sound of a window where the focus is currently located". In order to guide users more vividly and accurately, a first guide map may also be set on the first operation guidance page.

In some embodiments, referring to FIG. 5A, a skip control and a next operation control may also be set on the first operation guidance page. When the user selects the skip control, the first operation guidance page shown in FIG. 5A is closed, and a second operation guidance page shown in FIG. 5B is no longer presented. In a case where the user selects on the next operation control, then the page is switched to the second operation guide page shown in FIG. 5B, where the second operation guidance page presents a second operation prompt message, such as "Operation 2: Pressing a confirmation button on the remote controller, the window where the focus is currently located may be presented in a full-screen mode". In order to guide users more vividly and accurately, a second guide map may also be set on the second operation guidance page.

In some embodiments, referring to FIG. 5B, a next operation control and a back control may also be set on the second operation guidance page. In a case where the user selects the back control, the page goes back to the first operation guidance page shown in FIG. 5A. In a case that the user selects on the next operation control, the page is switched to a third operation guidance page shown in FIG. 5C, where the third operation guidance page presents a third operation prompt message, such as "Operation 3: Pressing a back button on the remote controller to exit from the full-screen mode". In order to guide users more vividly and accurately, a third guide map may also be set on the third operation guidance page.

In some embodiments, referring to FIG. 5C, a close control and a back control may also be set on the third operation guidance page. When the user selects the close control, the third operation guidance page is closed and the current operation guidance process is ended, and the first window and the second window are presented. In a case where the user selects the back control, the user returns to the second operation guidance page shown in FIG. 5B.

In some embodiments, a third control may also be set on the third operation guidance page, that is, a "No longer prompt" button control in FIG. 5C, and the user selects the third control on the third operation guidance page to close the third operation guidance page. When the current signal source is played later, in a case that the media data pushed by the terminal device is received, the first operation guidance page, the second operation guidance page and the third operation guidance page will not be presented again, but the first window and the second window will be present in the split-screen playback mode, that is, after the first operation guidance, the user selects the "No longer prompt" button, and the subsequent operation guidance processes will not be executed.

In some embodiments, the three operation guidance pages shown in FIG. 5A to FIG. 5C may be browsed page by page through a specified operation, such as selecting the next operation control and the back control as described in the above embodiments. For a display apparatus that supports touch screen, the operation guidance page can be switched by sliding the page left or right; or the operation guidance page may be switched by clicking the left or right button on the remote controller. The switching method between operation guidance pages is not limited to the embodiments described in the disclosure.

In some embodiments, referring to FIG. 3 and FIG. 4, an exit control may be set on the second window, and the user can select the exit control on the second window to pause playing the media data at any time. It should be noted that, the operation of pausing the playback of media data is not limited. Alternatively, the media data may also be played naturally. For example, for media data in a video format with a total playing duration of 30 minutes, when it is detected that the playback process of the media data reaches the 30$^{th}$ minute (that is, an end point/a time point at which the playback ends), the playback of the media data ends.

Figure 6:
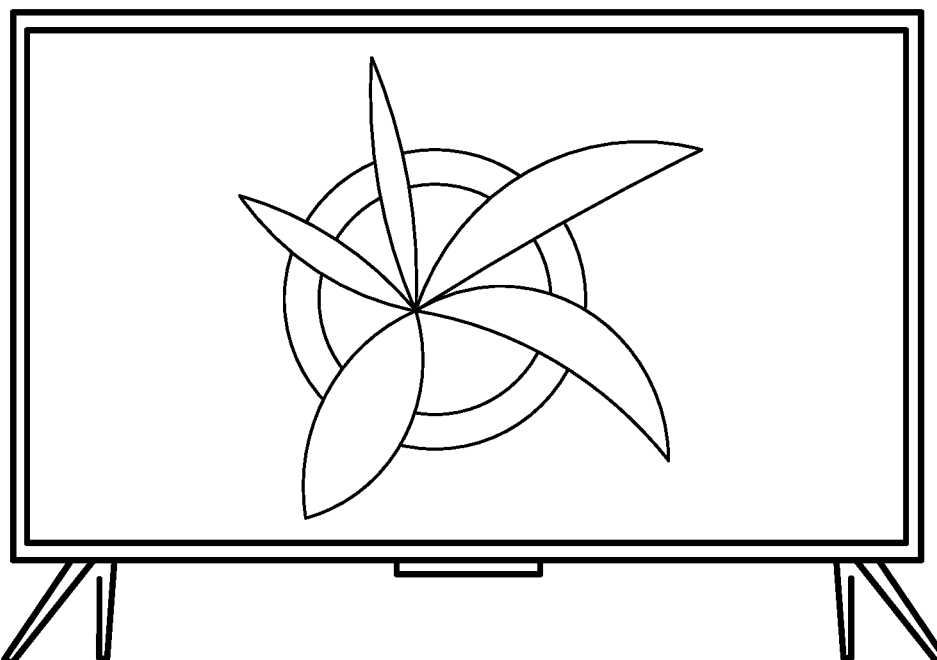
FIG. 6 illustrates an interface display effect C when media data playback ends according to some embodiments of the disclosure.

In some embodiments, when it is detected that the playback process of the media data has naturally reached the end, or an operation of pausing playing the media data is received from the user, as shown in FIG. 6, the second window needs to be destroyed, and the first window is switched to the full-screen mode to present the video of the current signal source, and the audio output device or module plays the audio of the current signal source.

In some embodiments, before destroying the second window, in a case that the focus is on the second window, the audio output path is switched to play the audio of the current signal source after destroying the second window, and stop playing the audio of the media data to ensure that the audio and video of the media data end playing synchronously.

Figure 7A:
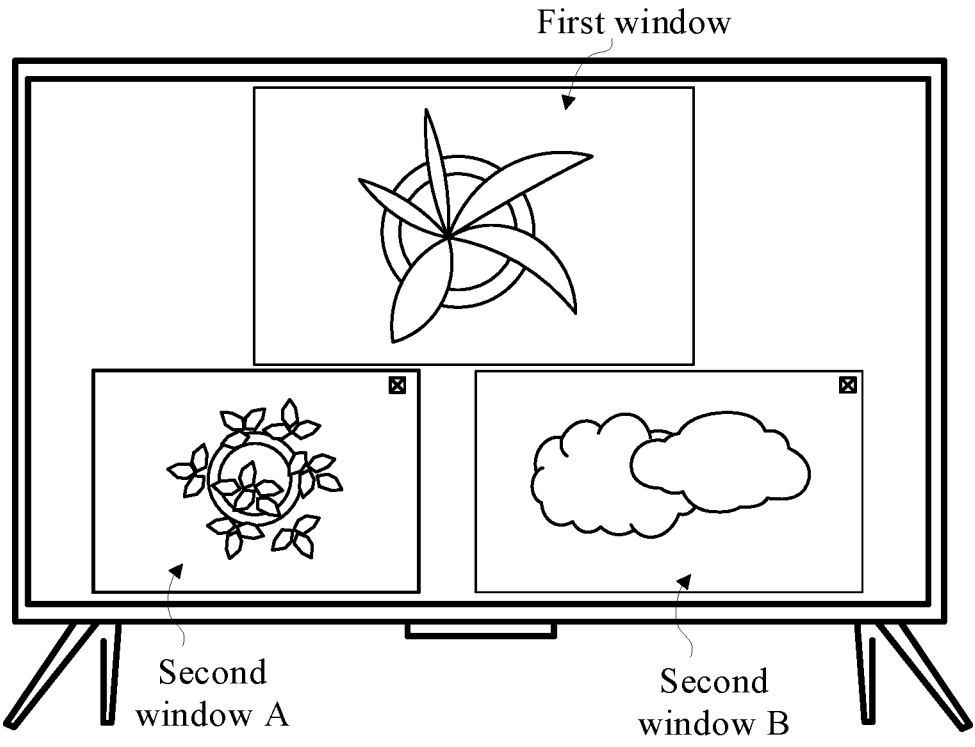
FIG. 7A illustrates an interface display effect D when the quantity of the second windows is 2 according to some embodiments of the disclosure.
Figure 7B:
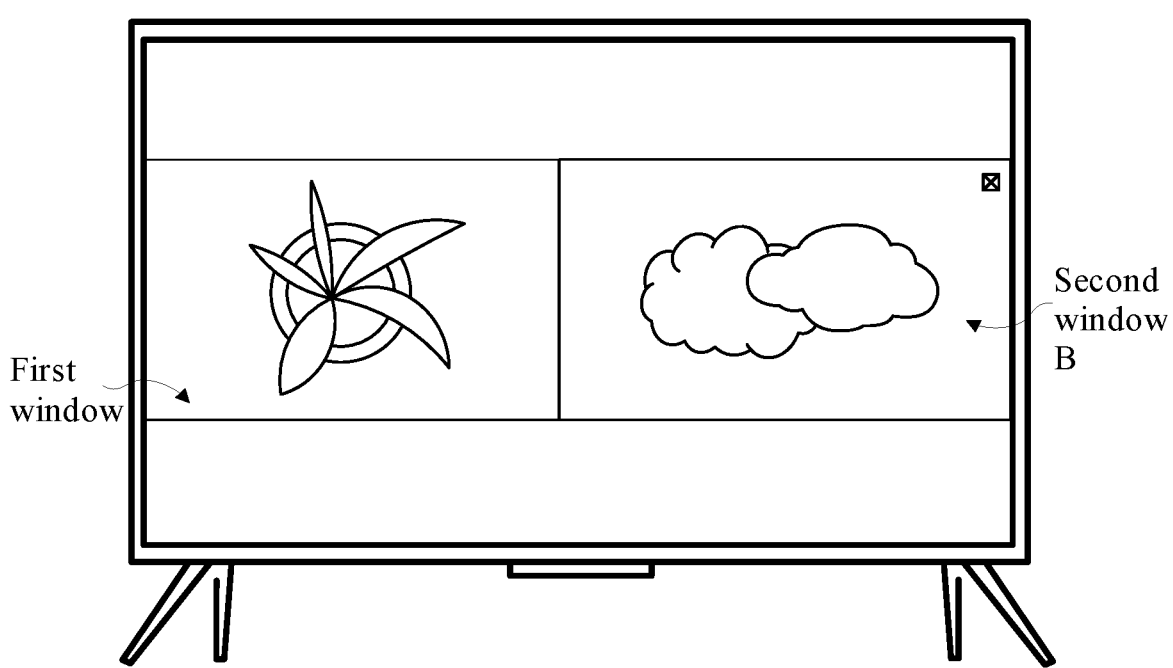
FIG. 7B illustrates a schematic diagram of interface changes when the second window A in FIG. 7A is destroyed according to some embodiments of the disclosure.

In some embodiments, in a case that the number M of second windows is greater than 1, for example, when M=2, the second window A and the second window B are included, the second window A is used to play media data A', and the second Window B is used to play media data B', as shown in FIG. 7A, the layout of the interface in this case is that the first window is at the top, the second window A is at the bottom left, and the second window B is at the bottom right. When the media data A ends, or the user inputs an operation to stop playing the media data A', the second window A is destroyed, as shown in FIG. 7B, at this time only the first window and the second window B are presented on the interface. Since the total number of windows has changed, the layout of the split-screen playback interface may be adaptively adjusted, so that the first window is on the left side of the middle part, and the second window B is on the right side of the middle part.

That is, when the number of second windows exceeds one, each time a second window is destroyed, the layout of the split-screen playback interface may be adaptively adjusted according to the total number of windows after decreasing the window destroyed, and a size, a split screen scaling ratio, and a relative position of each window may be adjusted. Until all M second windows are destroyed, the first window is switched to the full-screen mode, and the audio output path only outputs and plays the audio of the current signal source, and stop playing the audio of any media data. It should be noted that the total number of windows in the split-screen playback interface, the size (scaling ratio) and interface layout of each window may be adapted according to actual needs, which is not limited in the disclosure. The UI shown in the embodiments of the disclosure and the drawings are merely exemplary, and the actual design and application may use other designs.

Referring to the description of various embodiments from UI perspective mentioned above, in an exemplary embodiment, FIG. 8 shows a method for playback in split screen, the method is executed by the processor(s) 250 in the display apparatus, and the processor(s) 250 can control the display to present an UI interface, the UI interface can present data such as video, text, and images, etc., and the processor(s) 250 may also control a sound output device (i.e. speaker) inside the display apparatus or an external power amplifier (such as, sound bar, etc.) to play audio. Specifically, the method includes the following steps.

S101, upon receiving media data pushed from a terminal device, generating a first window and a second window on a display of the display apparatus.

S102, controlling the display to present the first window and the second window in a split-screen playback mode on an interface of the display according to a split-screen scaling ratio and a relative position layout between the first window and the second window.

S103, presenting video data of a current signal path of the display apparatus on the first window, and playing the media data pushed from the terminal device on the second window.

S104, detecting whether an operation for switching a focus among the windows is received; in response to receiving the operation for switching the focus among the windows is received, the flow goes to S105, otherwise, the flow goes to S104.

S105, determining a target window where the focus is currently located. The user may adjust the focus to switch between the first window and the second window through the remote controller, voice or touch screen, etc., and the window having the focus currently is the target window.

S106, playing audio data associated with the target window via a sound output device or an external power amplifier. When the focus on the window is moved and switched, the interface layout of the split-screen playback window remains unchanged, and only switches to output audio data associated with the target window corresponding to the focus. For example, when the target window is the first window which has the focus, only audio of the current signal source is played, that is audio of the target window with focus is played; when the target window is the second window, only audio of the media data is played.

S107, detecting whether a first preset operation on the first window is received. When the first preset operation is received, the flow goes to S108; otherwise, the current playing state is maintained, and the flow goes to S107.

S108, switching the target window to a full-screen mode.

S109, detecting whether a second preset operation is received. If the second preset operation is received, the flow goes to S110, otherwise, a state of displaying the target window in the full-screen mode is maintained, and the flow goes to S109.

S110, switching the target window from the full-screen mode to a thumbnail mode. The target window exits from the full-screen mode and returns to the thumbnail mode. After switching, the interface returns to the split-screen playback mode, and the sizes and layouts of the first and second windows remain unchanged, which are consistent with the target window before switching to the full-screen mode.

S111, detecting whether a condition for stopping playing the media data is met. The condition includes that a playing process of the media data reaches an end, and an operation for stopping playing the media data is received. In a case that the condition of stopping playing the media data is met, the flow goes to S112, otherwise, the flow goes to S103.

S112, destroying the second window, controlling the first window to present the video data of the current signal source in the full-screen mode, and controlling the sound output device or the external power amplifier to play the audio data of the current signal source. That is, when the condition for stopping playing the media data is met, the split-screen playback mode is exited, and the playback state before receiving the media data is resumed.

In some embodiments, the split-screen playback mode may have scene requirements. For example, the user hopes to play a game strategy in split-screen while playing a game. When the user watches wired TV, in a case that media data associated with the game strategy pushed from the terminal is received, the user prefers to maintain the current state of playing the wired TV independently instead of viewing the media data. Therefore, whether to enable the split-screen playback mode may be determined according to playback scene factors such as a type of a signal source and a picture mode output from the signal source.

Figure 9:
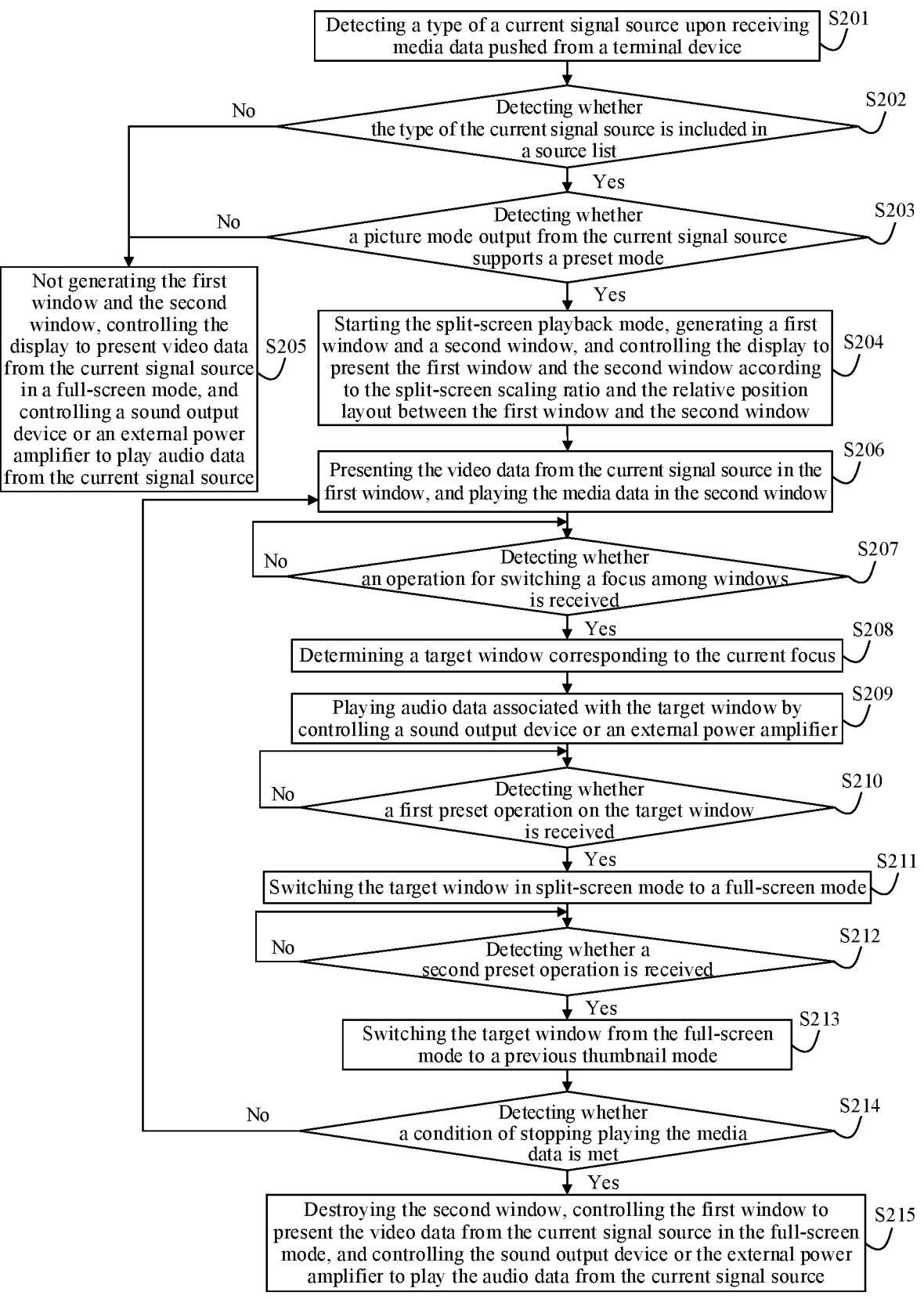
FIG. 9 illustrates a flow diagram of another method for playback in split screen according to some embodiments of the disclosure.

On the basis of the previous embodiments, in an exemplary embodiment, FIG. 9 shows another split-screen playback method, the method includes the following steps.

S201, detecting a type of a current signal source upon receiving media data pushed from a terminal device.

S202, detecting whether the type of the current signal source is included in a source list.

In some embodiments, the source list includes signal source type(s) that supports the split-screen playback mode. For example, in a case that the user sets that the split-screen playback mode is supported in a game scenario, the HDMI port connected with the game console may be added to the source list. In a case that the type of the current signal source is included in the source list, the flow goes to S203, otherwise, the flow goes to S205.

S203, detecting whether a picture mode output from the current signal source supports a preset mode. The preset mode is a picture mode indicated by a setting configuration that allows split-screen playback, such as a game mode, a TV mode, and the like. In a case that the picture mode output from the current signal source supports a preset mode, the flow goes to S204, otherwise, the flow goes to S205.

S204, starting the split-screen playback mode, generating a first window and a second window, and controlling the display to present the first window and the second window according to a split-screen scaling ratio and relative position layout between the first window and the second window.

S205, not generating the first window and the second window, controlling the display to present video data from the current signal source in a full-screen mode, and controlling a sound output device or an external power amplifier to play audio data from the current signal source.

As discussed above, the signal source of the display apparatus comprises signal source inputs from multiple sources, including signal sources via external device interfaces (for example, HDMI port(s), USB port(s), Antenna/cable port and the like), signal sources from external devices according to one or more wireless communication protocols (for example, cast content from a portable terminal device) and signal sources from web or streaming applications. The types of the signal sources and the picture mode are respectively detected in S202 and S203, which are two determination conditions used to determine whether the current playing scene supports split-screen playback mode. In the embodiments, the split-screen playback mode is started when the two determination conditions are both met. If any of the determination conditions is not met, the split-screen playback mode is not started, that is, the first window and the second window are not generated and presented. Instead, the audio and video from the current signal source are independently presented on a single screen.

In some embodiments, it can also be set to activate split screen playback mode when either of the two determination factors is met. For example, the spilt-screen playback process will be executed as long as current source signal is detected as HDMI source, regardless of the picture mode output from the HDMI signal source. For another example, it is detected that the picture mode of the current interface is the gaming mode, and the gaming mode is not output via the HDMI port but originates from a game application installed on the display apparatus, the split-screen playback operation may also be initiated. It should be noted that the determination factors for starting the split-screen playback mode may be set according to the actual scenarios, and is not limited to the embodiments of the disclosure. After S204 is executed, the flow goes to S206.

S206, presenting the video data from the current signal source in the first window, and playing the media data in the second window.

S207, detecting whether an operation for switching a focus among windows is received. In a case that the operation for switching the focus among the windows is received, the flow goes to S208, otherwise, the flow goes to S207.

S208, determining a target window corresponding to the current focus. The user may adjust the focus to switch between the first window and the second window through the remote controller, voice or touch screen, etc., and a window where the focus is currently located is the target window.

S209, playing audio data associated with the target window by controlling a sound output device or an external power amplifier. When the focus within a window is changed, the interface layout of the split-screen playback window remains unchanged, and only switches to output the audio data associated with the target window with the focus. For example, when the target window is the first window, only the audio of the current signal source in the first window is played; when the target window is the second window, only the audio of the media data is played.

S210, detecting whether a first preset operation on the target window is received. In a case that the first preset operation is received, the flow goes to S211; otherwise, the current playing state is maintained.

S211, switching the target window in the split-screen mode to the full-screen mode.

S212, detecting whether a second preset operation is received. In a case that the second preset operation is received, the flow goes to S213; otherwise, the state of presenting the target window in the full-screen mode is maintained.

S213, switching the target window from the full-screen mode to a previous thumbnail mode. After switching, the sizes and position layouts of the first window and the second window remain unchanged, which are consistent with the sizes and position layouts of the first window and the second window before the target window switching to the full-screen mode.

S214, detecting whether a condition of stopping playing the media data is met. The condition includes that the playing process of the media data reaches an end time point of the media data, or an operation for stopping playing the media data is received. In a case that the condition of stopping playing the media data is met, the flow goes to S215; otherwise, the flow goes back to S206.

S215, destroying the second window, controlling the first window to present the video data from the current signal source in the full-screen mode, and controlling the sound output device or the external power amplifier to play the audio data from the current signal source. That is, when the condition of stopping playing the media data is met, the split-screen playback mode is exited, and the playback state before receiving the media data is resumed.

It can be seen from the above embodiments that when the display apparatus receives the media data pushed from the terminal device, display in split screen is started, the first window and the second window are generated first, and the first window and the second window are simultaneously presented in a split-screen playback interface, then the video data from the current signal source is loaded and presented in the first window, and the media data is presented synchronously in the second window. For example, when the current signal source is the game console connected with the display apparatus via HDMI port, and the media data is the video about gaming strategy, the game operation interface is loaded and presented in the first window, and the video about gaming strategy is displayed in the second window synchronously. In the disclosure, when the media data pushed from the terminal is received, there is no need to switch the signal source, and the playback process of the current signal source will not be changed. The split-screen playback mode displays data from two or multiple sources synchronously, so as to realize the synchronous playback of video from multiple sources. In addition, the disclosure may also provide embodiments for operation on data from a certain source independently by switching focus among windows, such as switching audio, switching between a full-screen mode and a thumbnail display mode, etc., to improve user interaction experience, and may also determine whether to start split-screen playback according to the actual scene needs.

In some embodiments, the display apparatus is used as a device for receiving a screen projection, and the mobile device is used as a device for sending the screen projection, and the display apparatus and the mobile device may not be in the same network environment.

Figure 10A:
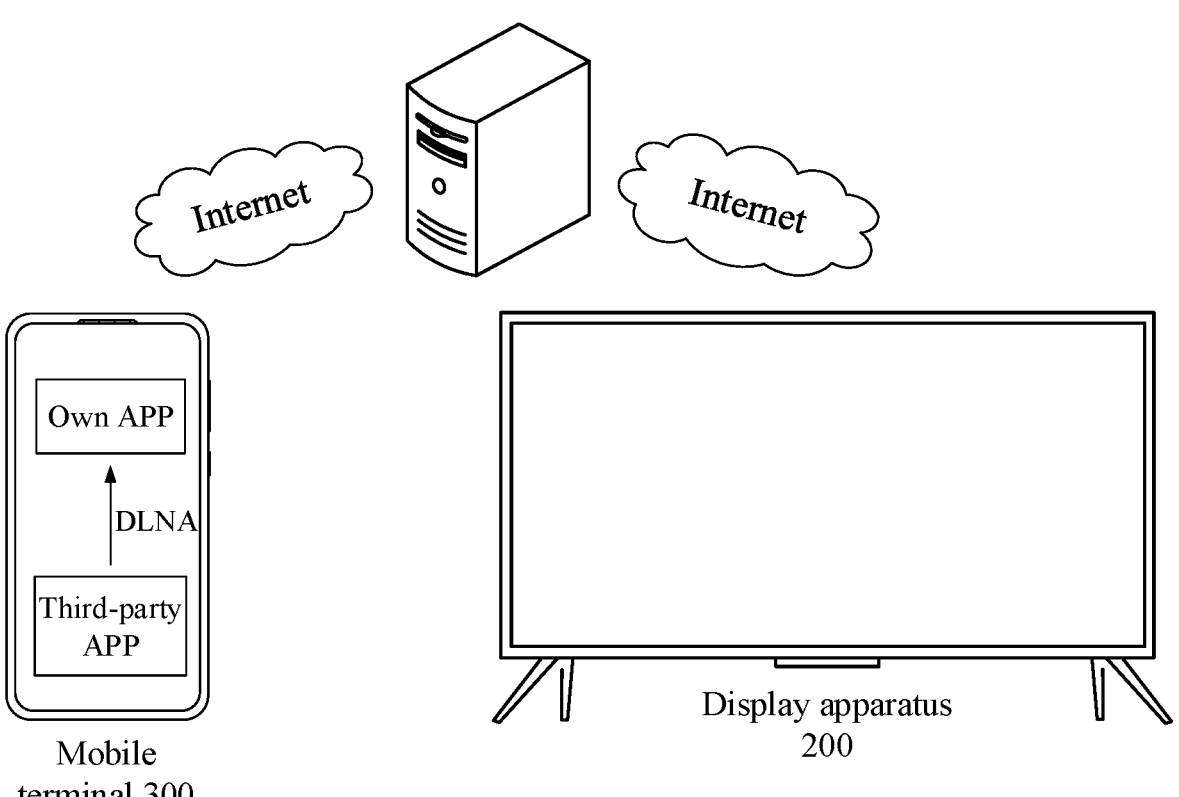
FIG. 10A illustrates a schematic structural diagram of a cross-network screen projection system according to some embodiments of the disclosure.

For cross-network projection, as shown in FIG. 10A, in some embodiments of the disclosure, a cross-network projection system is provided, including a mobile terminal 300, a display apparatus 200, and a server 400. The mobile terminal 300 includes a display component 330, a communicating device and a processor 380; the display apparatus 200 includes a display 275, a communicating device 220 and a processor 250. In cross-network scenario, the display apparatus is connected to a first network, while the mobile terminal is connected to a second network different from the first network. The first network and the second network may be different for basing on different communication protocols or other factors.

In practical scenarios, the user may start a proxy screen projection service through the mobile terminal 300, that is, starting a digital media renderer (DMR) service for screen projection reception, and receiving media file pushed via a digital media controller (DMC). the DMR is a main function module of the DLNA service, the DLNA service is achieved based on an universal plug and play (UPnP) protocol, a simple service discovery protocol (SSDP) is a device discovery protocol based on UPnP, a simple object access protocol (SOAP) is a control protocol defined by the UPnP based on the HTTP. The mobile terminal 300 establishes a communication connection with the display apparatus 200 through the proxy screen projection service.

The proxy screen projection service may be implemented through applications installed in the mobile terminal 300, system applications, system services, or background services, or the like.

Figure 10B:
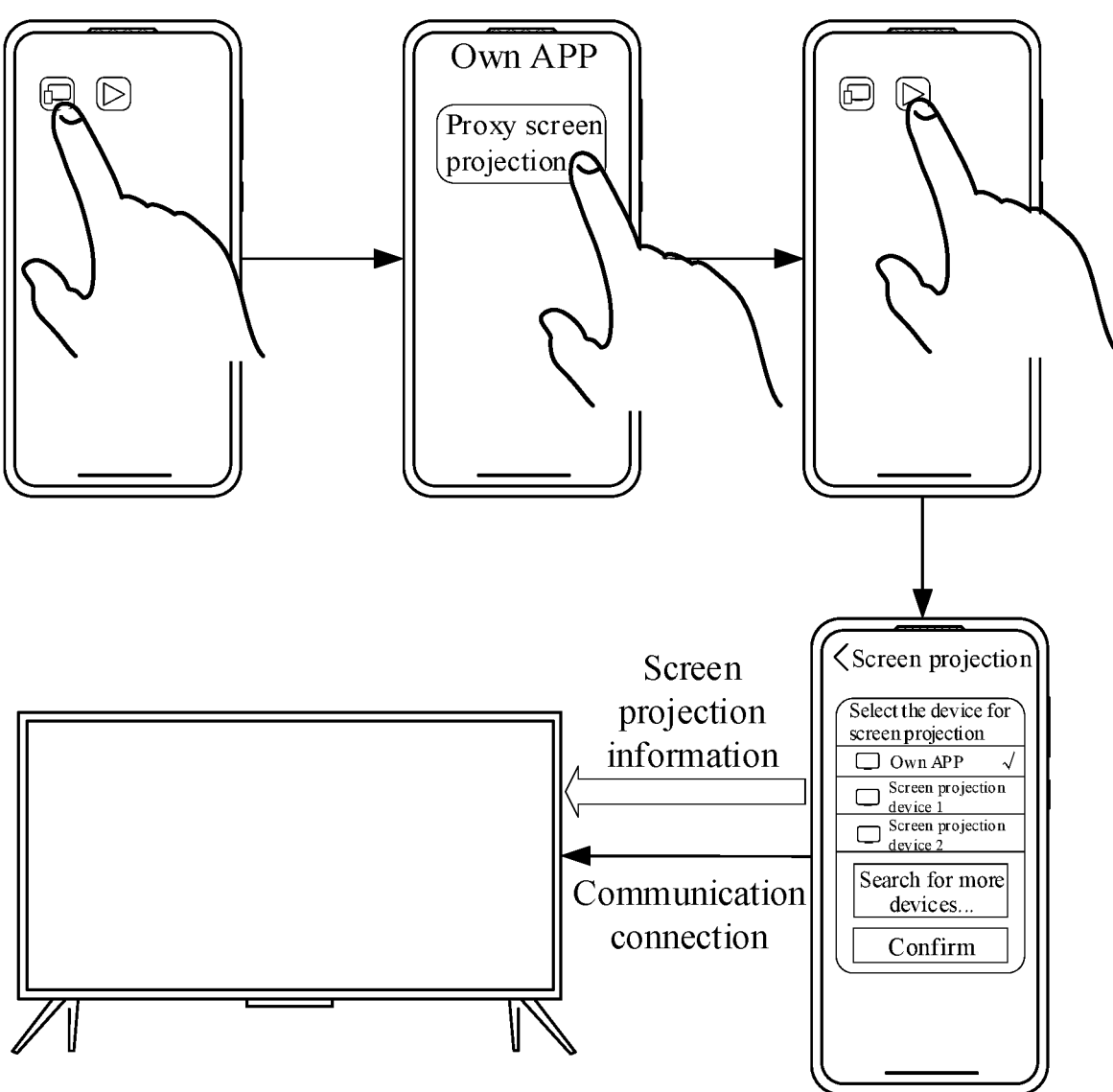
FIG. 10B illustrates a schematic diagram of an operation flow of cross-network projection according to some embodiments of the disclosure.
Figure 10C:
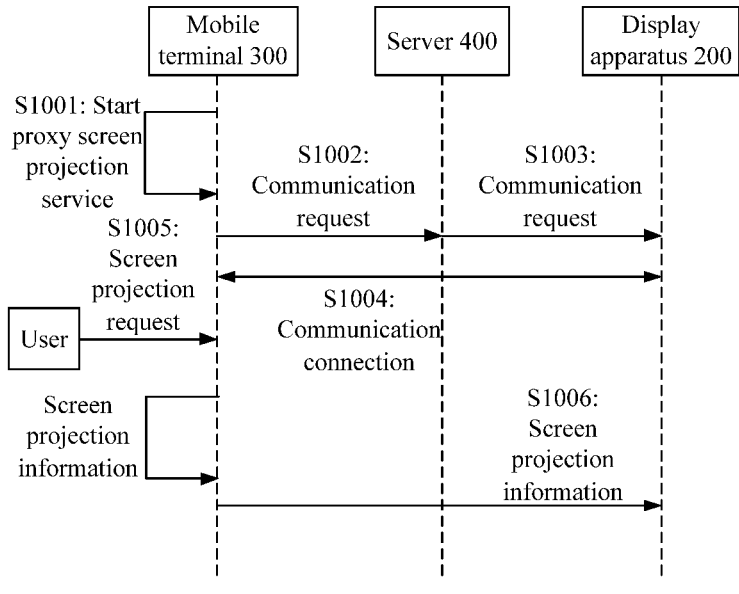
FIG. 10C illustrates a communication diagram via a server according to some embodiments of the disclosure.

In a case that the proxy screen projection service is implemented through an application installed on the mobile terminal 300, the application is its own APP. As shown in FIG. 10B and FIG. 10C, when the display apparatus 200 is turned on and the login account has been entered, the display apparatus 200 starts a receiving service to receive an instruction message and screen projection information from the server 400. The application is its own APP, the own APP is opened, and the user logs in the account on the own APP. The login account of the APP is the same as the login account of the display apparatus 200. The mobile terminal 300 sends a communication request (S1002) to the server 400, and the server sends a communication request (S1003) to the display apparatus 200. In this case, the server 400 establishes a communication connection (S1004) with its own APP client, and the proxy screen projection service (S1001) can be started by starting DMR function of DLNA service. When the proxy screen projection service is started, an IP address associated with S SDP and HTTP may be 0.0.0.0. The third-party APP is started at this time, and the third-party APP supports DMC function in DLNA, that is, the third-party APP can search for media source files on a digital media server (DMS), and the third-party APP may specify DMR that can play media source files to play or specify a device that controls the upload and download of multimedia files to or from DMS. When a user selects the movie that needs to be cast and pushes, and starts the screen projection service, the APP may be viewed in the screen projection device list, and the connection between the third-party APP and the own APP may be realized by selecting this push. In this case, the third-party APP may also send commands to the own APP.

After the own APP receives a screen projection request (S1005) sent from the third-party APP, the own APP can send screen projection information (S1006) to the display apparatus 200 that has established communication connections. The display apparatus 200 may analyze the screen projection information after receiving the screen projection request, to extract media connections, media names, etc., or to extract action information such as pausing playback in instructions, and play or control the media on the display apparatus 200 correspondingly.

In some embodiments, the own APP may process the received screen projection request, or transmit the screen projection information to the display apparatus 200 without processing.

When the IP of 0.0.0.0 is associated with or bound, all IPV4 addresses of the mobile terminal 300 are bound, and data packets from all network adapters may be received. No matter whether the third-party APP is bound with WiFi network or mobile data network of the mobile terminal, all of them are in the same local area network (LAN) as the own APP. In some embodiments, the bound IP may be a loopback address such as 127.0.0.1, which can establish a binding relationship with the same network.

Figure 11A:
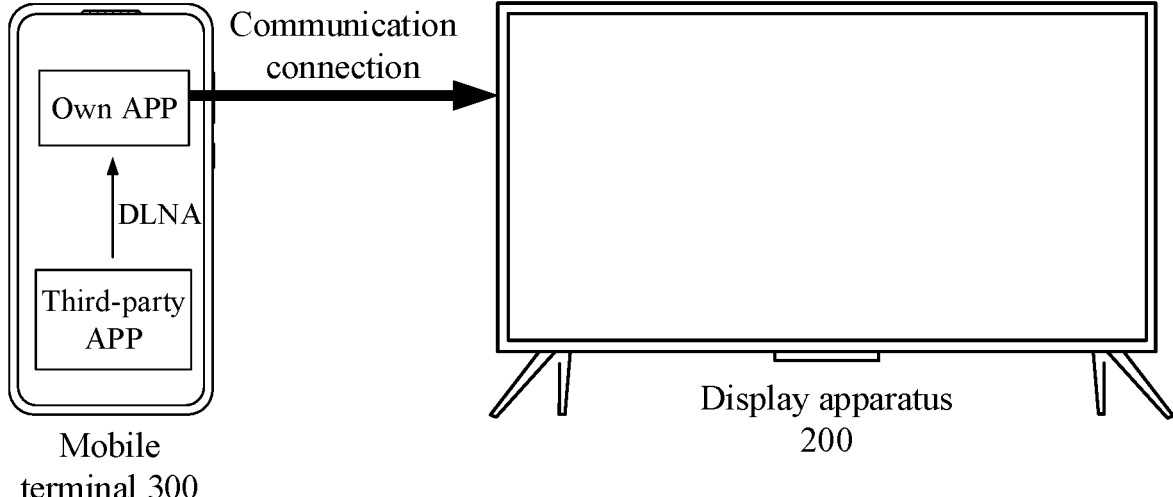
FIG. 11A illustrates a schematic structural diagram of another cross-network projection system according to some embodiments of the disclosure.

The mobile terminal 300 realizes a communication connection with the display apparatus 200 through the proxy screen projection service, the communication connection can be realized through the relay of a server, or the cross-network communication connection can be realized through direct connection without relaying, etc. The binding of the mobile terminal 300 and the display apparatus 200 may be bound with the same account, bound with a PIN code, bound with a MAC code of the display apparatus 200, or bound with a unique identifier, etc. The binding is used to make sure that the mobile terminal 300 knows which display apparatus it needs to cast the screen to, and the mobile terminal 300 realizes a communication connection with the display apparatus 200 through the proxy screen projection service for transmitting the screen projection information. The communication connection may be directly connected without relaying, and the cross-network connection between the mobile terminal 300 and the display apparatus 200 may be realized by both having public network IP addresses. Under a condition that the mobile terminal 300 is directly connected with the display apparatus 200 without involving a third party between the mobile terminal and the display apparatus, as shown in FIG. 11A, some embodiments of the disclosure provide a cross-network projection system, including the mobile terminal 300 and the display apparatus 200. The mobile terminal 300 include includes a display component 330, a communicating device and a processor 380; the display apparatus 200 includes a display 275, a communicating device 220 and a processor 250.

Figure 11B:
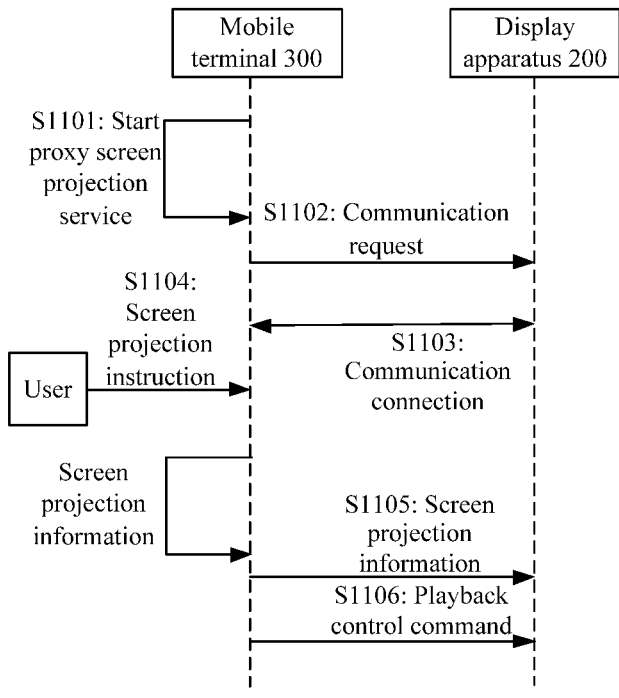
FIG. 11B illustrates a communication diagram in a direct connection mode according to some embodiments of the disclosure.

As shown in FIG. 11B, when the display apparatus 200 is turned on and the account has been logged in, the display apparatus 200 starts receiving an instruction message and screen projection information from the mobile terminal 300. In a case that the application is its own APP, the own APP is launched, and the user logs in the account on the own APP, and the login account of the own APP is the same as the login account of the display apparatus 200. The own APP sends (S1002) a communication request to the display apparatus 200. In this case, the display apparatus 200 establishes a communication connection (S1103) with the own APP. The proxy screen projection service may be started (S1101) by starting the DMR function of the DLNA. When the proxy screen projection service is started, the IP bound with the SSDP and the HTTP may be 0.0.0.0; the third-party APP is started at this time, and the third-party APP supports the DMC function in the DLNA, that is, the third-party APP can search for media source files on DMS, and the third-party APP may specify the DMR that can play the media source files to play or specify a device that controls the upload and download of multimedia files to or from the DMS. When the user selects the movie that needs to be cast and pushed, and opens the screen projection service, the own APP may be viewed in the screen projection device list, and the connection between the third-party APP and the own APP may be realized by selecting this push from the user. At this time, the third-party APP may also send commands to the own APP.

After the own APP receives a screen projection instruction (S1104) from the third-party APP, it can send the screen projection information (S1105) to the display apparatus 200 that has established a communication connection, and send a playback control command (S1106) to the display apparatus 200. The display apparatus 200 may analyze the screen projection information after receiving the screen projection instruction, to extract media connection, media name, etc., or to extract action information such as pausing playback in instructions, and play or control media on the display apparatus 200 accordingly.

In some embodiments, the mobile terminal 300 starts a DMR service for receiving the screen projection in the same local area network. This service does not perform the playback after receiving the command successfully, but only provides a proxy for the remote target playback device. A path for cross network communication is established between the proxy service and the display apparatus 200. After the agent service receives an instruction, it either processes the instruction or does not process it, and forwards the necessary information to the real executor, the display apparatus 200, through the communication path to realize the execution of the instruction.

Figure 12:
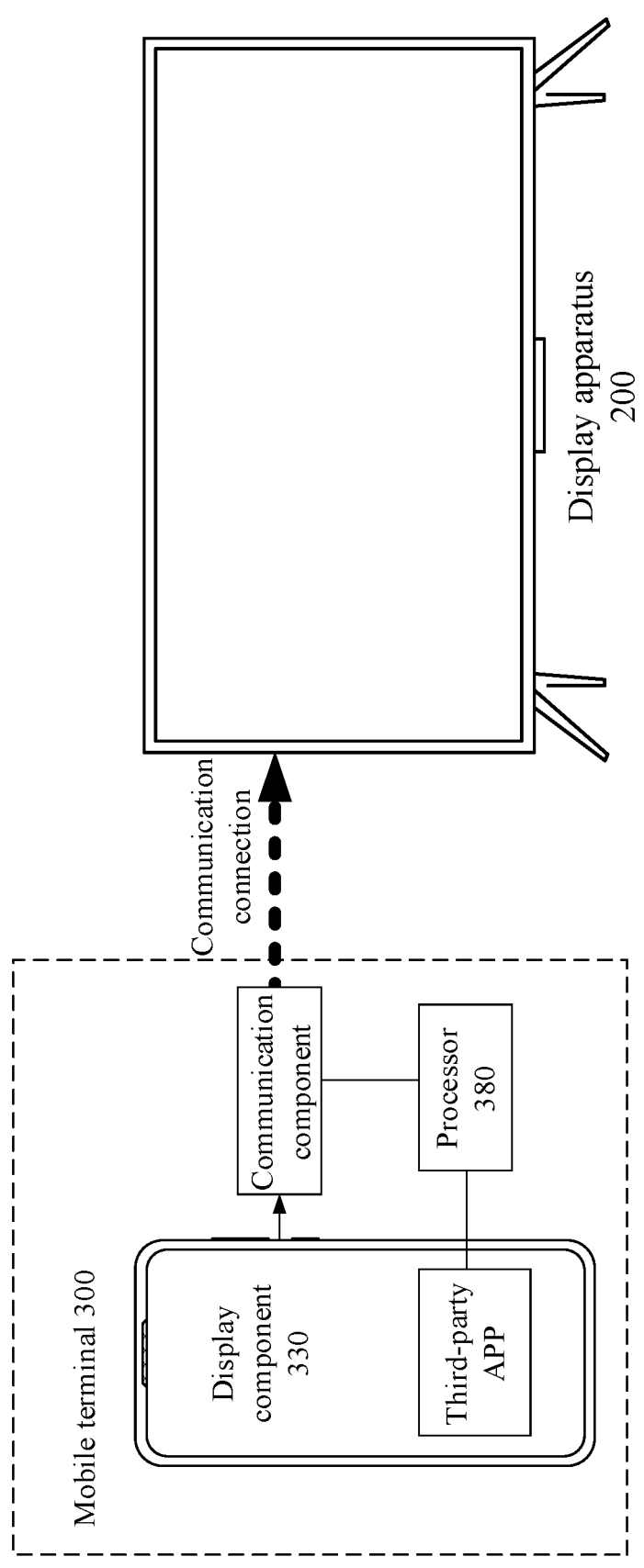
FIG. 12 illustrates a schematic diagram of a connection structure of a cross-network projection screen of a mobile terminal according to some embodiments of the disclosure.

Based on the above cross-network projection system, as shown in FIG. 12, some embodiments of the disclosure also provide a mobile terminal 300, including a display component 330, a communicating device, and a processor 380; the communicating device is configured to establish a communication connection with the display apparatus; the processor 380 is configured to: start a proxy screen projection service, and the proxy screen projection service sends a request for establishing a communication connection with the display apparatus through the communicating device; receive a screen projection request from a third-party application, where the screen projection request indicates a proxy screen projection service; in response to the screen projection request, establish a screen projection connection between the proxy screen projection service and the third-party application, and acquire screen projection information; and send the screen projection information to the display apparatus through the proxy screen projection service.

Where, when starting the proxy screen projection service, the processor is further configured to: start a function of receiving a screen projection request in the proxy screen projection service; bind the proxy screen projection service and a third-party application to a same local area network; in a case that the screen projection device of the third-party application selects the proxy screen projection service, the proxy screen projection service receives a screen projection request from the third-party application.

Figure 13:
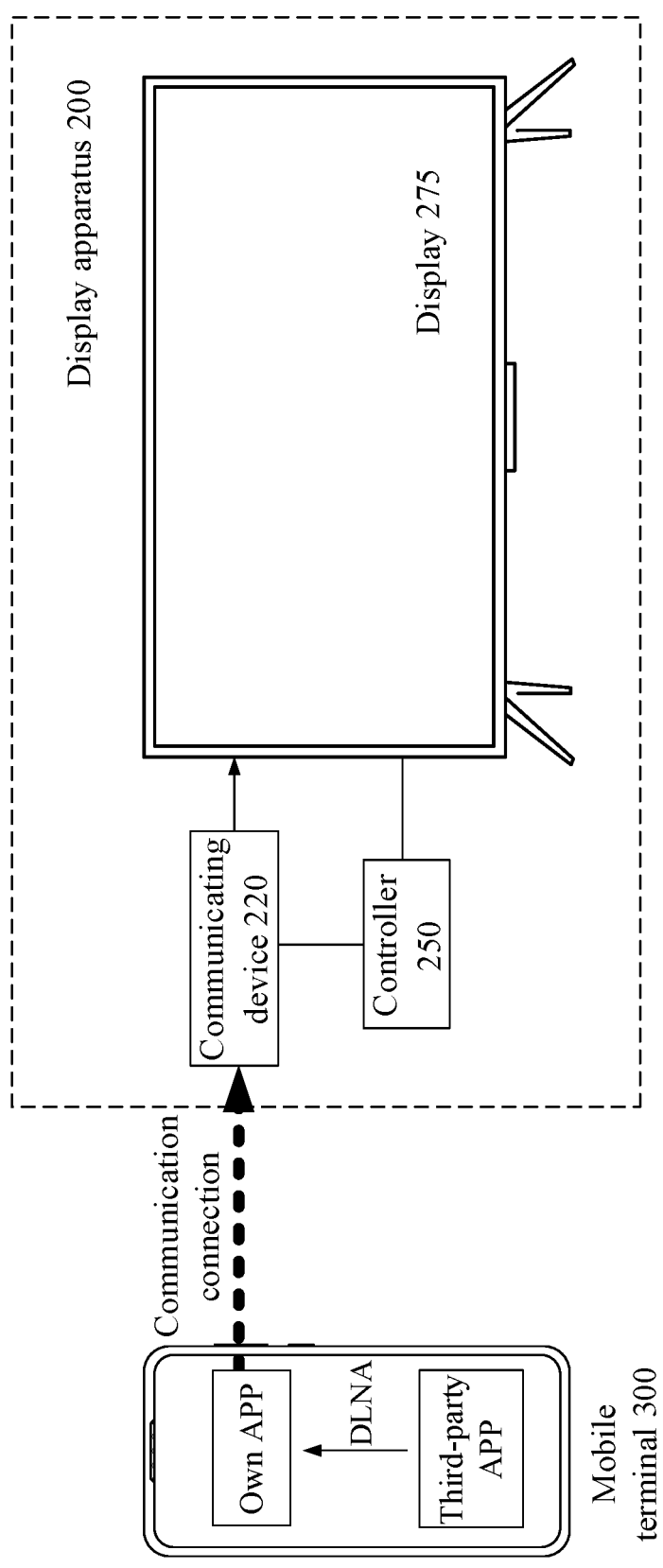
FIG. 13 illustrates a schematic diagram of a connection structure of a cross-network projection screen of the display apparatus according to some embodiments of the disclosure.

As shown in FIG. 13, some embodiments of the disclosure also provide a display apparatus 200, including a display 275, a communicating device 220 and a processor 250. The communicating device 220 is configured to establish a communication connection with the mobile terminal; the processor 250 is configured to receive a request for establishing communication connection sent from the mobile terminal; receive screen projection information and a playback command in response to the request, and analyze the screen projection information, and video name information in the screen projection information.

In some embodiments, a cross-network projection method is also provided, which is applied to a cross-network projection system. The cross-network projection system includes a portable terminal 300 and a display apparatus 200. The method includes: the mobile terminal 300 starts the proxy screen projection service, and the proxy screen projection service sends a request for establishing a communication connection with the display apparatus through a communicating device; the display apparatus 200 receives the request for establishing communication connection, and communicates with the mobile terminal according to the request. The proxy screen projection service acquires a screen projection instruction input from a user in a third-party application. The proxy screen projection service establishes a screen projection connection with the third-party application, and acquires screen projection information; the mobile terminal 300 sends the screen projection information to the display apparatus through the proxy screen projection service. The display apparatus 200 analyzes the screen projection information, and presents a screen projection video.

In addition, as a large-screen device, the display apparatus can provide users with a better viewing experience. In the related art, the user can cast the content from the mobile phone to a display apparatus, so that the content from the mobile phone can be viewed on the display apparatus, making the viewed image clearer. However, the projection technology is highly dependent on the system. Terminals with different systems need to use different projection technologies to achieve mirror projection with the display apparatus. It is impossible for multiple systems to use the same projection technology to realize the mirror projection operation. Exemplarily, a mobile phone whose operating system type is Android uses miracast technology to realize mirror projection, and a mobile phone whose system is IOS uses airplay technology to realize mirror projection.

Before discussing the mirror projection method according to the embodiments of the disclosure in detail, the universal plug and play (UPNP) protocol is discussed first, and the basis of a digital living network alliance (DLNA) technology is the UPNP protocol. The workflow of the UPNP protocol is briefly discussed below:

Step 1: first addressing, which is used for a device to obtain a network address.

Step 2: performing device discovery processes, i.e., a control point (i.e. a device type of UPNP device) searches for devices in the entire network, and the devices also broadcast their own existence. The discovery processes may obtain some information about the devices, for example, a type of a device, a globally unique identifier of the device and an address for describing the device.

Step 3: performing description processes, to obtain detailed information in the description file. In this step, the detailed capabilities of the device can be known.

Step 4: performing control steps, such as sending push information and responding to the push information.

Step 5: processing an event. The event is similar to an observer mode, and the observer is notified of any state change of the device.

Step 6: displaying, as a supplement to the control steps and the event processing, the information and status of the device may be seen in the step of displaying.

Throughout the processes, different devices play different roles and realize different functions. UPNP devices play the roles of a digital media renderer (DMR), a digital media server (DMS) and a digital media control point (DMC). The DMR device may support the play and control of media, the DMS device may support the functions of media acquisition, recording, storage and output, and the DMC device may control the UPNP device. According to the role definition and the entire workflow, the UPNP protocol may implement the media push function. The media push refers to that the DMC pushes the media resources on the DMC to the DMR after the DMC discovers the DMR device. It should be noted that the media resources are not the content of screen mirroring projection, the DMR obtains the media file stream from the DMS to play, and the DMC may control the playback of the media on the DMR, and at the same time, the media playback status on the DMR may be sent back to the DMC.

For example, the general function is that the TV acts as a DMR, and the mobile phone acts as a DMC and a DMS. The mobile phone first discovers the TV, and then pushes the media resources from the mobile phone to the TV for display.

Figure 14:
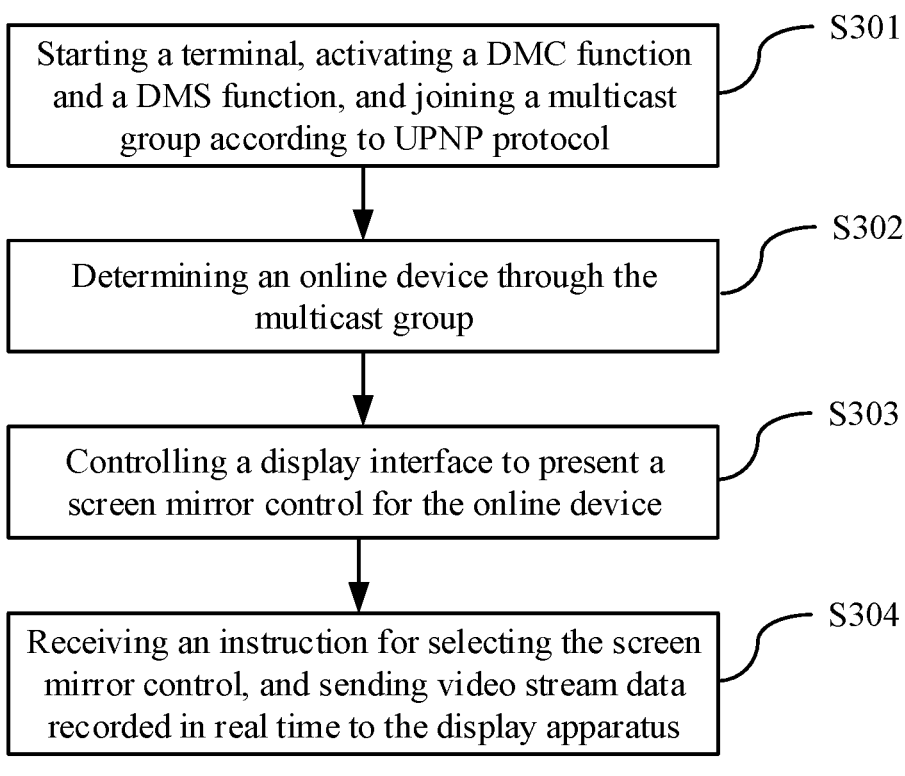
FIG. 14 illustrates a flow diagram of a mirror projection method according to some embodiments of the disclosure.

A mirror projection method according to the embodiments of the disclosure is described below in detail, which can realize mirror projection for real-time video stream transmission based on UPNP protocol, and the type of system using this method is not limited, as shown in FIG. 14, including:

S301, starting a terminal, activating a DMC function and a DMS function, and joining a multicast group according to UPNP protocol;

S302, determining an online device through the multicast group; and

S303, controlling a display interface to present a screen mirror control for the online device. In the embodiments of the disclosure, the terminal acts as a DMC and a DMS, and starts the DMC and DMS functions.

The display apparatus is powered on, activates the DMR function, creates a device service capability, and joins the multicast group of the UPNP protocol. In the embodiments of the disclosure, the display apparatus acts as a DMR role and starts the DMR function. The creation of device service capabilities refers to the creation of DMR service capabilities.

In some embodiments, the multicast group address of the UPNP protocol may be 239.255.255.250. In the embodiments of the disclosure, the terminal can select a device that needs mirroring projection, that is, an online device.

In the embodiments of the disclosure, the online device is determined automatically or manually.

The method of determining the online device automatically is discussed first.

In some embodiments, after joining the multicast group, an online message is sent by the display apparatus.

The terminal receives the online message of the display apparatus, and analyzes a device service capability of the display apparatus.

In a case that the display apparatus has the DMR capability, then the display apparatus is an online device.

In some embodiments, the online message includes a local network address of the display apparatus. According to the local network address of the display apparatus, the terminal determines that the device corresponding to the local network address of the display apparatus is the online device.

In some embodiments, the display apparatus can realize the mirror projection with the terminal only when the display apparatus has the DMR capability. In the embodiments, when an online message of the display apparatus is received, the display apparatus may serve as the online device that will receive mirror projection from the terminal.

In some embodiments, the terminal receives an operation for searching the display apparatus, and sends search information to the multicast group.

The display apparatus receives the search information sent from the terminal to the multicast group; determines whether the display apparatus has the DMR capability according to the search information; in a case that the display apparatus has the DMR capability, sends a search success message to the terminal. The terminal receives the search success message, and determines that the display apparatus is an online device.

In some embodiments, the user may input the name of the display apparatus in a search box, and the device service capability of the display apparatus is analyzed in this case. In the embodiments, when it is analyzed that the display apparatus has the DMR capability, the display apparatus is used as the online device that can receive screen cast from the terminal.

In some embodiments, the search information includes a local network address of the terminal. The display apparatus sends the search success message to the terminal according to the local network address of the terminal.

The two methods above determine the online device through automatic or manual methods respectively.

In some embodiments, after the online device is determined, the terminal controls the display interface to present the screen mirror control for the online device.

S304, receiving an instruction for selecting the screen mirror control, and sending video stream data recorded in real time to the display apparatus. The display apparatus receives the video stream data, and decodes and plays the video stream data.

Figure 15:
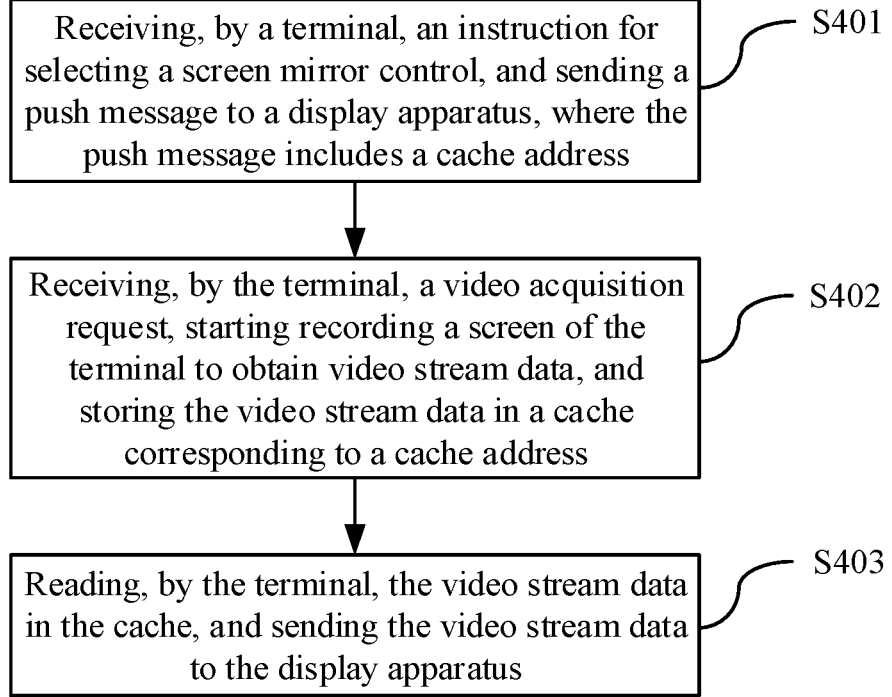
FIG. 15 illustrates a flow diagram of a mirror projection method according to some embodiments of the disclosure.

In some embodiments, the step of receiving the instruction for selecting the screen mirror control and sending the video stream data recorded in real time, as shown in FIG. 15, includes following S401 to S403.

S401, the terminal receives an instruction for selecting a screen mirror control, and sends a push message to a display apparatus, where the push message includes a cache address. For example, a screen mirror control may be presented on the user interface of the terminal, and the user may touch a position corresponding to the screen mirror control on the screen to generate an instruction for selecting the screen mirror control.

In some embodiments, the cache corresponding to the cache address is generated when the instruction for selecting the screen mirror control is received. The cache address of the cache is carried when the push message is sent to the display apparatus.

The display apparatus receives the push message sent from the terminal, analyzes the push message to obtain a cache address, and sends a video acquisition request to the terminal, and the video acquisition request includes the cache address.

In some embodiments, the display apparatus may determine whether to send a video acquisition request to the terminal according to actual needs. In a case where the display apparatus does not have the conditions for mirroring projection with the terminal, then the video acquisition request may not be sent to the terminal.

S402, the terminal receives a video acquisition request, starts recording a screen of the terminal to obtain video stream data, and stores the video stream data in a cache corresponding to the cache address. In the embodiments of the disclosure, the video stream data obtained by screen recording is the content displayed on the terminal in real time.

S403, the terminal reads the video stream data in the cache, and sends the video stream data to the display apparatus. It should be noted that as long as there is video stream data in the cache, the video stream data will be sent to the display apparatus all the time.

In some embodiments, the terminal receives a first instruction for stopping mirroring projection, stops recording the screen, stops reading video stream data from the cache and sending the video stream to the display apparatus.

In some embodiments, the display apparatus receives a second instruction for stopping mirroring projection, and stops decoding and playing the video stream data.

In some embodiments, the display apparatus receives an instruction for pausing decoding and playing the video stream data, and suspends decoding and playing video stream data.

In some embodiments, the display apparatus receives an instruction for re-decoding and playing the video stream data, and continues to decode and play the video stream data. In the embodiments of the disclosure, the instruction for re-decoding and playing the video stream data is received after suspending decoding and playing the video stream data.

In order to ensure real-time video streams transmission, in the embodiments of the disclosure, the following improvements are made: a data format for displaying and sending a video acquisition request to the terminal, and a data format for sending video stream data to the display apparatus after the terminal receives the video acquisition request, that is, request data and response data.

The UPNP protocol is designed for video stream transmitted according to HTTP protocol. The display apparatus sends the video acquisition request, and the terminal receives the video acquisition request and sends a response and transmits the corresponding video stream. The specific interaction flow comprises the following steps.

(1) Formats for transmitting local files through the UPNP protocol:

Request data format:

GET/XXXX. mp4 HTTP/1.1

Host:

Connection: close

Range: bytes=0

User-Agent: hsp/1.0(Linix: Android 6.0);

Reply data format:

HTTP/1.1 206 Partial Content

Content-Type: video/mp4

Content-Length: 3234061

Accept-Ranges: bytes

Content-Ranges: bytes 0-3234060/3234061

TransferMode.DLNA.org: Streaming

ContentFeatures.DLNA.org:

DLNA.org_PN=AVC_MP4_BL_CIF15_AAC_520;

DLNA.ORG_OP=01:DLNA.ORG_CI=1;

DLNA.ORG_FLAGS=

015000000000000000000000000000000

Connection: close

Date: Tue, 9 Mar. 2021 05:42:26GMT.

(2) Formats for transmitting real-time video streams according to UPNP protocol:

Request data format:

GET/cacdbd8e6fed4e2a06a5a32a3ced76021988f44f HTTP/1.1

Host: 192.168.1.125:8081

Connection: close

Range: bytes=0–

User-Agent: hsp/1.0 (Linux; Android 6.0);

Reply data format:

HTTP/1.1 200 OK

Content-Type: video/vnd.dlna.mpeg-tts transferMode.dlna.org: Streaming contentFeatures.dlna.org: DLNA.ORG_CI=1;

DLNA.ORG_FLAGS=

013000000000000000000000000000000

Connection: Keep-Alive

Date: Tue, 9 Mar. 2021 07:54:23 GMT

Cache-Control: no-store, no-cache, must-revalidate

Transfer-Encoding: chunked.

The formats for transmitting real-time video streams through the UPNP protocol should note the following content.

The generation of the cache address must be unique, so message-digest algorithm 5 (MD5) is used to encrypt and generate a unique ID to identify the video stream. For generating the local file MD5, a file path is generally used as a seed. There is no unified method for real-time video streams, a value of the MD5 can be generated by taking a timestamp of the obtained video stream as the seed. Since the timestamp is unique, the generated value of the MD5 is unique, so as to ensure the uniqueness of the cache address for obtaining the video stream.

Since the video stream has no length, the Content Length field, the Accept Ranges field, and the Content Range field should no longer respond.

The Content Type field is filled in based on the format of the transmission video stream. For example, when the video stream is packaged by TS, the video/vnd.dlna.mpeg-ns may be filled in.

DLNA.ORG_FLAGS=

013000000000000000000000000000000: the UPNP protocol specifies that each digit is an octal number, the most significant 8-bit is a valid value, and the Least Significant 24-bit is the reserved value, and the most significant 8-bit is converted to binary format as: 0000,0001,0011. The 24-bit is the tm-s (Streaming Mode Flag) flag, and when the DLNA 1.5 version is supported (the 20-bit is the dlna-v1.5 flag), this value must be set to 1, i.e., Streaming Mode is supported, and once the terminal has data, it must be transmitted to the display apparatus quickly enough.

The Connection field should be Keep Alive, to reduce the amount of time consumed by sending an HTTP request for a TCP connection, to allow the display apparatus and the terminal to continue transmitting content through this connection.

Cache-Control: no-store, no-cache, must-revalidate: the client is required to revalidate at the server for every request.

Transfer-Encoding: chunked: HTTP is specified as a persistent connection, but a length and a range (a unit that defines the range of the request) cannot be determined according to the characteristics of real-time video streams. Therefore, data must be transmitted in a chunked mode. Transfer-Encoding: chunked is specified, and the content entity needs to be packaged into a block for transmission in the future.

In some embodiments, mirror projection method, display apparatus and terminal are provided. Some embodiments of the disclosure may utilize the UPNP protocol to enable terminals of different systems to realize a screen projection operation using the same screen projection technology. The method includes: starting a display apparatus, enabling a DMR function, creating a device service capability, and joining a multicast group according to UPNP protocol, so that the terminal determines an online device according to the multicast group, controls the display interface to present a screen image control for the online device, and sends the video stream data obtained by real-time screen recording when the terminal receives a command for selecting the screen image control corresponding to the online device; and the display apparatus receives the video stream data, and decodes and plays the video stream data.

For the convenience of explanation, the above explanation has been made in combination with specific embodiments. However, the above discussion is not intended to be exhaustive or to limit the embodiments to the specific forms disclosed above. On the basis of the above teachings, various modifications can be obtained. The selection and description of the above embodiments are to better explain the principles and practical applications, such that those skilled in the art better use the embodiments and various variant embodiments suitable for specific use considerations.

What is claimed is:

1. A display apparatus, comprising:

a display, configured to present a picture and/or a user interface;

a communicating device, in communication with a device or network;

a sound output device or an external power amplifier, configured to output sound; and at least one processor, in connection with the display, the communicating device and the sound output device, and configured to execute instructions to cause the display apparatus to:

upon receiving media data pushed from a terminal device, detect a type of a current signal source of the display apparatus, and detecting whether a picture mode output from the current signal source supports a preset mode;

detecting whether the type of the current signal source is included in a source list by comparing the type of the current signal source with one or more signal source types that support a split-screen playback mode included in the source list;

in response to said detecting that the type of the current signal source is included in the source list of the display apparatus and the picture mode output from the current signal source supports the preset mode, start the split-screen playback mode in the display apparatus, generate a first window and a second window, present the first window and the second window, on the display and display video data from the current signal source in the first window and display the media data from the terminal device in the second window;

in response to said detecting that the type of the current signal source is not included in the source list and the picture mode does not support the preset mode, not generate the first window and the second window, present the video data from the current signal source in a full-screen mode on the display, and control the sound output device or external power amplifier to play the audio data from the current signal source.

2. The display apparatus according to claim 1, wherein the at least one processor is further configured to execute instructions to cause the display apparatus to: in response to a playing process of the media data reaching an end time point of the media data or receiving an operation for stopping playing the media data, destroy the second window, control the first window to present the video data from the current signal source in the full-screen mode, and control the sound output device or external power amplifier to play the audio data from the current signal source.

3. The display apparatus according to claim 1, wherein the at least one processor is further configured to: upon receiving an operation for switching a focus among windows, determine a target window corresponding to a current focus, wherein the target window is the first window or the second window; and control the sound output device or external power amplifier to play audio data associated with the target window.

4. The display apparatus according to claim 3, wherein the at least one processor is further configured to execute instructions to cause the display apparatus to: upon receiving a first preset operation on the target window, switch the target window in the split-screen mode to the full-screen mode; upon receiving a second preset operation on the target window, switch the target window from the full-screen mode to a thumbnail mode, wherein sizes and position layouts of the first window and the second window in the thumbnail mode remain unchanged, which are consistent with sizes and position layouts of the first window and the second window before the target window switching to the full-screen mode.

5. The display apparatus according to claim 1, wherein the at least one processor is further configured to execute instructions to cause the display apparatus to: control the display to present the first window and the second window according to a split-screen scaling ratio and relative position layout between the first window and the second window.

6. The display apparatus according to claim 1, wherein the media data is projected from the terminal device to the display apparatus.

7. The display apparatus according to claim 1, wherein the preset mode is a picture mode indicated by a setting configuration that allows split-screen playback.

8. The display apparatus according to claim 1, wherein the signal source comprises at least one of a signal source connected with the display apparatus via an external device interface, a signal source from a web or streaming application, or a signal source from an external device according to communication protocols.

9. A split-screen playback method for a display apparatus, comprising: upon receiving media data pushed from the terminal device, detecting a type of a current signal source of the display apparatus, and detecting whether a picture mode output from the current signal source supports a preset mode;

detecting whether the type of the current signal source is included in a source list by comparing the type of the current signal source with one or more signal source types that support a split-screen playback mode included in the source list;

in response to said detecting that the type of the current signal source is included in the source list of the display apparatus and the picture mode output from the current signal source supports the preset mode, starting a split-screen playback mode in the display apparatus, generating a first window and a second window, presenting the first window and the second window, on a display of the display apparatus, and displaying video data from the current signal source in the first window and displaying the media data from the terminal device in the second window;

in response to said detecting that the type of the current signal source being is not included in the source list and the picture mode does not support the preset mode, not generating the first window and the second window, and presenting the video data from the current signal source in a full-screen mode on the display, and controlling the sound output device or external power amplifier to play the audio data from the current signal source.

10. The method according to claim 9, further comprising: in response to a playing process of the media data reaching an end time point of the media data or receiving an operation for stopping playing the media data, destroying the second window, controlling the first window to present the video data from the current signal source in the full-screen mode, and playing the audio data from the current signal source.

11. The method according to claim 9, further comprising: upon receiving an operation for switching a focus among windows, determining a target window corresponding to a current focus, wherein the target window is the first window or the second window; and playing audio data associated with the target window.

12. The method according to claim 11, further comprising: upon receiving a first preset operation on the target window, switching the target window in the split-screen mode to the full-screen mode; upon receiving a second preset operation on the target window, switching the target window from the full-screen mode to a thumbnail mode, wherein sizes and position layouts of the first window and the second window in the thumbnail mode remain unchanged, which are consistent with sizes and position layouts of the first window and the second window before the target window switching to the full-screen mode.

13. The method according to claim 9, further comprising: controlling the display to present the first window and the second window according to a split-screen scaling ratio and relative position layout between the first window and the second window.

14. The method according to claim 9, wherein the media data is projected from the terminal device to the display apparatus.

15. The method according to claim 9, wherein the preset mode is a picture mode indicated by a setting configuration that allows split-screen playback.

16. The method according to claim 9, wherein the signal source comprises at least one of a signal source connected with the display apparatus via an external device interface, a signal source from a web or streaming application, or a signal source from an external device according to communication protocols.

\* \* \* \* \*